United States Patent
Parvizi et al.

(10) Patent No.: US 9,439,041 B2
(45) Date of Patent: Sep. 6, 2016

(54) SYSTEMS AND METHODS FOR CALIBRATION BASED INDOOR GEOLOCATION

(71) Applicant: Lighthouse Signal Systems, LLC, Cambridge, MA (US)

(72) Inventors: Parviz Parvizi, Cambridge, MA (US); Mohammad Heidari, Natick, MA (US)

(73) Assignee: Lighthouse Signal Systems, LLC, Cambridge, MA (US)

( * ) Notice: Subject to any disclaimer, the term of this patent is extended or adjusted under 35 U.S.C. 154(b) by 533 days.

(21) Appl. No.: 13/932,646

(22) Filed: Jul. 1, 2013

(65) Prior Publication Data

US 2014/0018095 A1 Jan. 16, 2014

Related U.S. Application Data

(60) Provisional application No. 61/666,520, filed on Jun. 29, 2012.

(51) Int. Cl.
*G01S 3/02* (2006.01)
*H04W 4/02* (2009.01)
*H04W 4/04* (2009.01)

(52) U.S. Cl.
CPC ............ *H04W 4/025* (2013.01); *H04W 4/043* (2013.01)

(58) Field of Classification Search
CPC ........... G01S 3/02; G01S 19/48; G01S 19/49
USPC ................................ 342/451, 357.31, 357.32
See application file for complete search history.

(56) References Cited

U.S. PATENT DOCUMENTS

| | | | |
|---|---|---|---|
| 2002/0196188 A1* | 12/2002 | Holt | G01S 3/02 342/453 |
| 2006/0089153 A1* | 4/2006 | Sheynblat | G01S 5/0252 455/456.1 |
| 2012/0007779 A1* | 1/2012 | Klepal | G01S 5/021 342/451 |
| 2013/0084892 A1* | 4/2013 | Teyeb | H04W 4/023 455/456.6 |
| 2013/0166193 A1* | 6/2013 | Goldman | G01C 21/12 701/410 |
| 2013/0293416 A1* | 11/2013 | Waters | G01S 19/48 342/357.31 |
| 2014/0295878 A1* | 10/2014 | Yang | G01S 5/0257 455/456.1 |

* cited by examiner

*Primary Examiner* — Harry Liu
(74) *Attorney, Agent, or Firm* — Goodwin Procter LLP

(57) ABSTRACT

In a system facilitating the calibration of a map-point grid for an indoor location determination, the grid includes several map points, each having a radio frequency (RF) data fingerprint being associated therewith. At least one of: (i) RF signal data from several RF sources, (ii) a user specified location indication, and (ii) tracking data from a sensor, the tracking data indicating a user's movement relative to a base map point, are received. The map-point grid is updated based on, at least in part, at least one of (i) adjusted RF data, the received RF data being adjusted using systematic analysis thereof, (ii) the tracking data, and (iii) the location indication. A user's location may be determined based on the fingerprints associated with the map-point grid, and sensor data.

38 Claims, 12 Drawing Sheets

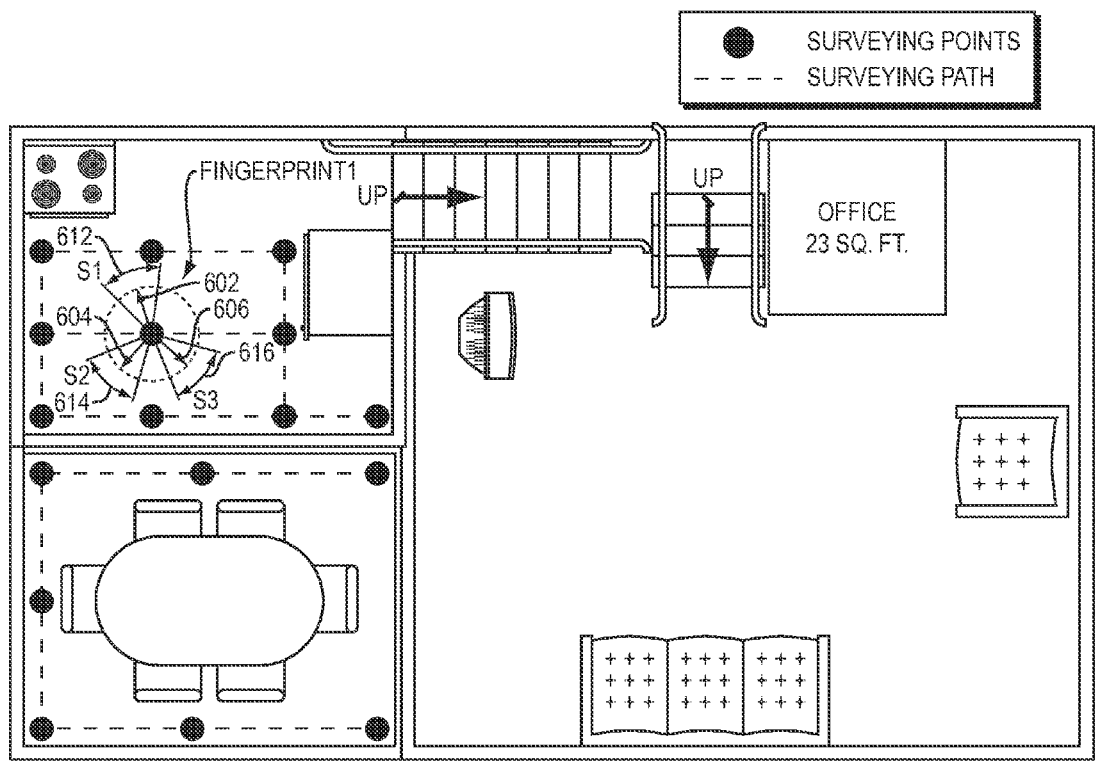
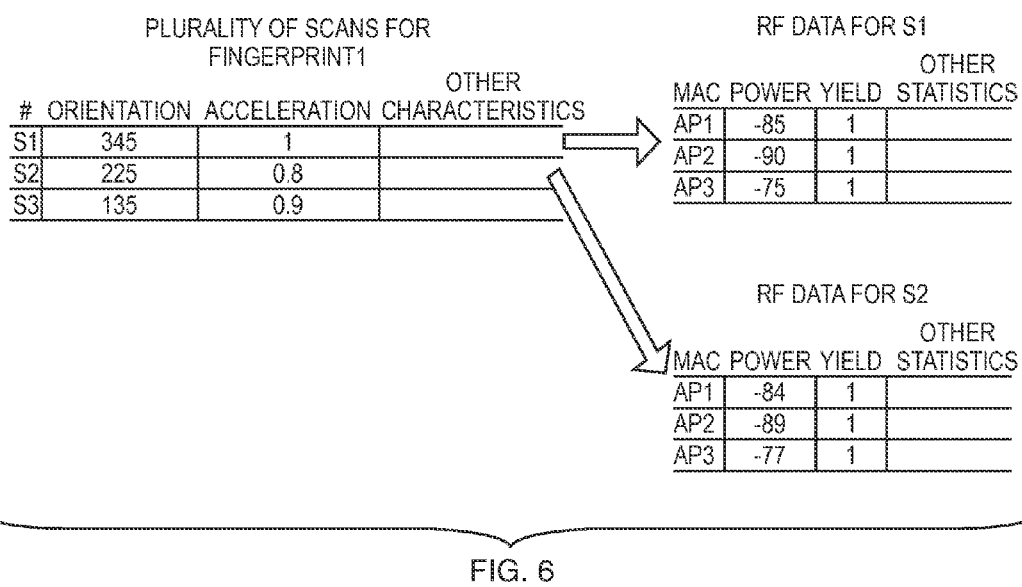
FIG. 6

SYSTEMS AND METHODS FOR CALIBRATION BASED INDOOR GEOLOCATION

CROSS-REFERENCE TO RELATED APPLICATIONS

This application claims the benefit of and priority to U.S. Provisional Patent Application Ser. No. 61/666,520, filed Jun. 29, 2012, the entire contents of which are incorporated herein by reference.

BACKGROUND OF THE INVENTION

Recently, the problem of determining the location of a person or object in indoor environments has gained tremendous attention. The applications of such systems include locating public safety officers in indoor environments, locating valuable objects or instruments in hospitals, and monitoring youngsters and elderly people in indoor environments. The main two approaches to positioning are time-of-arrival (TOA) techniques and received-signal-strength (RSS) techniques. In systems using TOA techniques, a mobile station broadcasts an impulse (a very wideband signal), and all the fixed stations, with known coordinates, respond to it. From that response, the mobile station or a central server can determine the mobile station's distance from each fixed reference point. The location of the mobile terminal is then calculated using trilateration or triangulation. In systems using RSS techniques, the signal strength of a known reference is used to find the distance between a fixed station and a mobile station, and again the location of the mobile station is found using trilateration or triangulation. Another approach uses the signal strengths from all the nearby fixed stations to build a database of locations with their respective signal strengths. The location of an unknown mobile station is determined by fingerprinting. In such systems the new signal strength measurements can be compared to the database and the best matching location can be found from the database.

Traditional location techniques such as GPS are shown to be unsuccessful in indoor environments because physical barriers degrade GPS signals. GPS relies on accurate distance estimation between the fixed station (GPS satellite) and mobile station (the receiver). This distance is obtained accurately if and only if the link between the two stations is not blocked by any other objects and line-of-sight (LOS) conditions exist between the transmitter and receiver. In indoor environments, the GPS signals are blocked by different objects, so they are attenuated to such an extent that they are either not detectable by the receiver or the distance estimation process yields highly inaccurate distance.

TOA techniques in indoor environments also suffer from the same problem. In indoor environments, the signals between stations are usually blocked by interior objects in the indoor environment, so the line-of-sight component of the signal is not detectable. This problem is referred to as the non-line-of-sight (NLOS) problem in positioning literature. The NLOS condition is shown to be the most problematic cause of inaccurate indoor location for TOA techniques. Therefore, it is suggested that for indoor environments, the performance of the RSS technique is superior to the performance of the TOA technique.

In RSS techniques that use the signal strength to determine the distance between the stations, the signal strength is usually related to the distance via a path-loss model which predicts the received signal strength at any specific distance based on the transmit power, signal attenuation gradient (known as path-loss exponent), number of attenuators and their respective attenuation level, and the distance to the stations. Such path-loss models highly depend on the correct and stable measurement of the signal strength. However, it is also shown that signal power changes rapidly over time. The stations in indoor environments suffer even more from this change as they face lots of obstacles within indoor environments. Therefore, such RSS systems also have found limited use for indoor positioning.

Indoor location determination systems based on finger-printing methods can address some of the problems encountered by the TOA and RSS-based systems. The accuracy of fingerprint-based systems, however, is highly dependent of the quality of the fingerprint database, often provided as a map-point grid. A typical problem with the fingerprint database is that the database can become out-of-date frequently. This can happen because in an indoor location, such as a mall, the various radio frequency (RF) sources, e.g., access points, used to build the database are owned or operated by a number of independent entities (e.g., store owners/operators, kiosk vendors, seasonal, temporary service providers, etc.) that may not have any affiliation to one another, and are not under the control of any central entity. Therefore, these RF sources can change over time, causing the fingerprint database to become out of date. For example, a store operator may simply move an access point (AP) from the front of the store to the back, causing the observed RF characteristics of the AP to change. A store may change ownership, and as such, an existing RF source may no longer be present and/or may be replaced by another one, that has different characteristics. New APs may be added, and the existing ones may be removed, over time.

One way to address this problem is to consider a yield of an observed RF signal, as described in U.S. Pat. No. 8,350,758, the entire contents of which are incorporated herein by reference. The yield of a signal a measure of how often the signal is detected over a period of time or how many times it is detected over a number of observations during signal monitoring. The quality of the fingerprint database can be improved alternatively, or in addition to considering the yield information, by performing frequent calibrations of the database/map-point grid. Usually, a skilled engineer or technician is required to accurately record the calibrator's location and the observed RF data, and many such personnel may have to be employed frequently, so as to accurately calibrate a large map-point grid. Such a calibration can be prohibitively expensive. Calibrations can be performed in a cost-effective manner using unskilled persons, but these calibrations can be unreliable due to human errors in calibration. Therefore, new and improved systems and methods are needed to perform fingerprint database in an efficient and cost-effective manner.

SUMMARY OF THE INVENTION

Various embodiments of the present invention feature systems/methods that facilitate on going, accurate calibration of a fingerprint database using unskilled persons, so as to minimize the calibration cost. Alternatively, or in addition, these systems/methods can improve the accuracy of map points in the database. This is achieved, in part, by providing a mechanism to verify the accuracy of at least some of the data received from a calibrator's device. The verification can be performed, at least in part, by comparing a piece of data received from a calibrator (also called user) with corresponding expected data stored in a database.

Alternatively, or in addition, the accuracy of RF data received from a user can be determined, at least in part, by correlating those and/or other user-supplied data with sensor data received from one or more sensors installed in the user's device. These correlations can also be used in computing the location of a different user who is not the calibrator. Based on the determined accuracy, a weight is assigned to the RF data received from the user's device and used to synthesize a fingerprint, such that the readings determined to contain an error are weighted less than the readings determined to be substantially error free. Thus, a high quality fingerprint database can be obtained without having to rely on trained personnel for calibration.

Accordingly, in one aspect, a method for determining a location of a user within an indoor environment includes receiving radio frequency (RF) signal data from each RF source from several RF sources. For each RF source, the yield thereof is computed based on the received data. The method also includes selecting a subset of fingerprints from a database of fingerprints, based on, at least in part, the yield associated with each one of the several RF sources. In addition, the method includes receiving tracking data from a sensor, such as an inertial navigation system (INS), and determining a location of a user based on, at least in part: (i) the RF signal data received from each of the RF sources in the subset, and (ii) the received tracking data. Thus, the accuracy of location determination can be improved, e.g., by corroborating the estimates obtained from an RF fingerprint database with the estimates of user movement obtained from, e.g., the INS data.

In another aspect, a method of determining a location of a user within an indoor environment includes receiving at a first time instant (e.g., t0), a first set of radio frequency (RF) data from a number of RF sources, and computing, based at least in part on the first set of RF data, a first location estimate and a second location estimate, (e.g., L1 and L2). At a second time instant (e.g., t2) a second set of RF data are received from several RF sources, and tracking data from an inertial navigation system are obtained as well. The method further includes computing, based at least in part on the second set of RF data, a third location estimate and a fourth location estimate (e.g., L3 and L4). In addition, a fifth location estimate (e.g., L5) is computed based in part on the first location estimate (e.g., L1), and a sixth location estimate (e.g., L6) is computed based in part on the second location estimate (e.g., L2). Computation of both the fifth and sixth location estimates is also based in part on the received tracking data. The method also includes computing an error metric by comparing: (i) the fifth location estimate with the third and/or fourth location estimates, and (ii) the sixth location estimate with the third and/or fourth location estimates. The method finally includes designating based at least in part on the computed error metric: either the first location estimate or the second location estimate (e.g., L1 or L2) as a location of the user at the first time instant (e.g., t0), and either the third location estimate or the fourth location estimate (e.g., L3 or L4) as a location of the user at the second time instant (e.g., t2).

In some embodiments, the method further includes associating an accuracy parameter with one of the first, second, third, and fourth location estimates, and the error metric may be based on, at least in part, the accuracy parameter. The accuracy parameter may be based on, at least in part, one or more of a type of a building, number the RF sources, power of the RF source, types of the RF sources, yield of the RF sources, tracking data, and statistics associated with tracking data.

In some embodiments, the method further includes computing a seventh location estimate based at least in part on the first set of RF data, and computing an eighth location estimate based at least in part on the second set of RF data. A ninth location estimate based at least in part on the seventh location estimate and the tracking data are computed as well. In this embodiment, the error metric is computed based in part on one or more of the seventh, eighth, and ninth location estimates. Thus, at either the first or the second time instant, or both, more than two estimates may be obtained based on RF data, and/or more than two estimates may be obtain based on the INS data. These estimates may be compared to determine which estimate was likely more accurate than the others at different times, e.g., at the first time instant, the second time instant, or both.

In another aspect, a method of calibrating a map-point grid for indoor location determination, in which the grid includes a number of map points, each having a radio frequency (RF) data fingerprint being associated therewith, includes receiving one or more of: (i) RF signal data from several RF sources, (ii) a user specified location indication, and (ii) tracking data from a sensor, the tracking data indicating a user's movement relative to a base map point. The method also includes updating the map-point grid based on, at least in part, one or more of (i) adjusted RF data, (ii) the tracking data, and (iii) the location indication. The adjusted RF data may be obtained by performing a systematic analysis of the received RF data. Updating the map-point grid includes one or more of updating fingerprints associated with one or more map points, updating the RF data associated with a map point and used in computing the fingerprint corresponding to the map point, and adding a new map point that has associated therewith a new location and a new fingerprint.

In some embodiments, updating the map-point grid includes computing an RF data fingerprint based on the received RF signal data, and computing a location of the user based on, at least in part, the tracking data. The computed location is different than the base map point. Thus, a new location and new fingerprint associated with that location are created. As such, the method also includes adding a new map point to the grid, and associating the new map point with the computed location and the computed RF data fingerprint. Thus, the map-point grid is enhanced with an additional map point that was previously not included in the grid.

In some embodiments, updating the map-point grid includes computing a spatial and directional orientation of the user at the base map point with respect to at least one of the several RF sources based on, at least in part, the tracking data. Thus, it may be determined whether the calibrator/user was facing a certain RF source and/or whether the user was standing steadily or moving about while the RF data was recorded. The method also includes updating a fingerprint associated with a map point in the grid, based on, at least in part, both the received RF data and the computed orientation. For example, if the user were not facing the RF source directly, the RF data corresponding to that source and/or the fingerprint associated with the map point may be underweighted. Similarly, if the user were not standing still, the RF data corresponding to that certain RF source and/or the fingerprint associated with the map point may be underweighted. The map point for which the fingerprint is updated can be the same as the base map point, or another map point in the grid.

In some embodiments, updating the map-point grid includes computing a location of a user based on, at least in part, the tracking data, and designating the computed location as a new map point. A set of other map points are associated with the new map point. The RF signal data received at the new map point from at least one of the several RF sources is updated, based on, at least in part, RF signal data received from that same RF source at each of the other map points in the set that is associated with the new map point. An RF data fingerprint is computed based in part on the updated RF signal data, and the computed RF data fingerprint is associated with the new map point.

Thus, in computing a fingerprint for a new map point to be added to the map-point grid, the RF data observed from a certain RF source, and to be used in computing the fingerprint, may be refined based on how RF data from that source was recorded at some other map points that may be near the new map point. This can increase the accuracy of the fingerprint associated with the new map point. Updating the received RF signal data may include computing an average of a parameter of the received RF signal data. The average can be a weighted average, and the parameter may be RF signal power, yield data, or a combination thereof. Before adding the new map point to the grid, a location of a user based on, at least in part, a location confirmation signal may be obtained at the new map point. The location confirmation signal can be provided, e.g., in response to a user indicating his or her presence at a certain location, e.g., by tapping on a corresponding location in a map displayed on the user's device. The method may include determining if the computed location is substantially same as the received location. The new map point may be added if the comparison is successful.

In some embodiments, the method includes selecting a map point based on, at least in part, the received tracking data, the received location indication, or both, and associating a set of other map points with the selected map point. The systematic analysis of the received RF data includes computing a fingerprint as a function of the RF signal data associated with each of the other map points in the set, and updating the map-point grid includes associating the computed fingerprint with the selected map point. The function may be interpolation, and the interpolation may be simple averaging or weighted averaging.

Thus, the sensor system may determine that the user/calibrator is present at a certain location associated with a map point in the grid. Alternatively, or in addition, the user may indicate his or her presence at such a map point, e.g., by tapping on a location/map point in a map displayed on the user's device. In some embodiments, the identified location may correspond to a new location to be added to the grid. A fingerprint at the new location is updated or computed based on, at least in part, the fingerprints corresponding to several other map points, such as map points in the vicinity of the selected map point. Thus, any spurious data that may have been used in the computation of the fingerprint for the selected map point may be smoothed using RF data observations and/or fingerprints associated with one or more other map points in the grid.

In some embodiments, the grid includes several routes, and each route corresponds to a set of map points that include a reference map point. A radio frequency (RF) data fingerprint is associated with each map point in the set of map points corresponding to each route. In this embodiment, receiving the user specified location indication includes receiving from a device associated with a user, an identification of a map point and an identification of a route. It is expected that the identified map point is substantially same as the reference map point. As such, updating the map-point grid includes updating a weight associated with the RF data fingerprint associated with each map point in the set of map points corresponding to the identified route, if the identified map point is determined not to represent the reference map point corresponding to the identified route. The reference map point may be a start map point, representing a starting point of the identified route, or an end map point, representing an end point of the identified route, or any other map point on or associated with the route.

Identification of the route may be received by receiving a designated route number and/or a designated route name. The identification of the route may be received by receiving a selection of the route from a specified list of routes that is displayed on the user's device. In this embodiment, receiving the RF signal data may include receiving, from the device associated with the user, RF data associated with each map point in the set of map points corresponding to the identified route. The fingerprint associated with each map point may be based on, at least in part, the received RF data associated with the corresponding map point.

In some embodiments, the grid includes a route corresponding to a set of map points, and receiving the RF signal data includes receiving several calibration scans corresponding to the route. Receiving each scan includes receiving sensor data associated with each map point in the set of map points corresponding to the route. To update the map-point grid, for each calibration scan, a value of a route parameter is determined, based on, at least in part, the sensor data corresponding to the scan. A weight is assigned to each calibration scan, based on, at least in part, a comparison of the determined value of the route parameter and a statistical value associated with the route parameter. Thus, for a single route, several scans may be obtained from one or more users. Scans determined to be unreliable based on a statistical analysis can be rejected or underweighted, so as to improve the quality of the fingerprint database.

The method may further include computing the statistical value associated with the route parameter, based on, at least in part, the RF and/or other sensor data corresponding to the several calibration scans. Updating the map-point grid may further include computing for each map point corresponding to the route an RF fingerprint, based on, at least in part, the several calibration scans and the weight assigned to each calibration scan. The route parameter may include one or more of a list of access points observable on the route, a power of an access point observable on the route, a yield of an access point observable on the route, a number of turns on a route, a length of a segment of the route, an orientation of a segment of the route, acceleration observable on the route, altitude associated with the route, and barometric pressure observable on the route. The sensor data may include inertial navigation sensor data, barometric data, etc.

In some embodiments, the grid includes a number of segments, and each segment includes a set of map points such that each map point corresponds to a map location. The systematic analysis in these embodiments includes designating a segment from the several segments as a candidate segment, and excluding from a data set used by a location-determination engine to compute a device location, radio frequency (RF) data associated with each map point in the set of map points associated with the candidate segment. A subset of map points is selected from the set of map points associated with the candidate segment, and a reference location is determined based on, at least in part, map locations corresponding to each map point in the subset. The method also includes obtaining from the location-determination engine a location, based on, at least in part, RF data associated with each map point in the subset. A weight associated with the candidate segment is adjusted in the data set used by the location-determination engine, based on, at least in part, a comparison of the obtained location with the reference location.

In some embodiments, the systematic analysis further includes selecting a set of segments, such that each segment in the set includes a map point that is within a specified distance (e.g., a few feet, tens of feet, etc.) from a map point corresponding to the candidate segment. Thus, the segments in the set are likely to be close to the candidate segment. A fitness measure based on a comparison of a fingerprint associated with the map point corresponding to the candidate segment and map points corresponding to the segments in the selected set may be computed. As map points of nearby segments are likely to have similar map points, the fitness measure can indicate accuracy of the fingerprint associated with the candidate segment. Therefore, the method may include further adjusting the weight associated with the candidate segment based on, at least in part, the fitness measure.

The candidate segment may include a first sub-segment and a second sub-segment connected to the first sub-segment at an angle other than 180°. In other words, a single segment of a route may include not only a path along a straight line, but also paths that include turns. In some embodiments, he subset consists essentially of a single map point, and the reference location includes the map location corresponding to the single map point.

In some embodiments, the grid includes a number of segments, each segment includes a set of map points, and each map point corresponds to a map location. The systematic analysis for updating the fingerprint database includes designating a segment from the several segments as a candidate segment. A set of segments is selected such that each segment in the set includes a map point within a specified distance from a map point corresponding to the candidate segment. A fitness measure is computed based on a comparison of a fingerprint associated with the map point corresponding to the candidate segment and map points corresponding to the segments in the selected set. In the data set used by the location-determination engine, a weight associated with the candidate segment is adjusted based on, at least in part, the fitness measure.

In another aspect, a system for determining a location of a user within an indoor environment, includes a receiver adapted to receive (i) radio frequency (RF) signal data from each RF source from a number of RF sources, and (ii) tracking data from a sensor. The system also includes a processor adapted to: (i) compute a yield of the RF source based on the received data, (ii) select a subset of fingerprints from a database of fingerprints, based on, at least in part, the yield associated with each one of the several sources, and (iii) determine a location of a user based on, at least in part: (a) the RF signal data received from each of the RF sources in the subset, and (b) the received tracking data. The sensor can be an inertial navigation sensor, and the system may include the sensor and/or memory to store various received data and/or intermediate and/or final data generated as a result of processing the received data. In some embodiments, the system is installable on a mobile communication device such as a cell phone, a smart phone, a PDA, a tablet, a laptop, etc.

In another aspect, a system for determining a location of a user within an indoor environment includes a receiver adapted to: (i) receive at a first time instant, a first set of radio frequency (RF) data from a number of RF sources, (ii) receive at a second time instant: (a) a second set of RF data from the several RF sources, and (b) tracking data from an inertial navigation system. The system also includes a processor adapted to compute: (i) based at least in part on the first set of RF data, a first location estimate and a second location estimate, (ii) based at least in part on the second set of RF data, a third location estimate and a fourth location estimate, (iii) a fifth location estimate based in part on the first location estimate, and a sixth location estimate based in part on the second location estimate, both the fifth and sixth location estimates also being based in part on the tracking data, and (iv) an error metric by comparing: (a) the fifth location estimate with at least one of the third and fourth location estimates, and (b) the sixth location estimate with at least one of the third and fourth location estimates.

The processor is further adapted to designate based at least in part on the error metric: (i) one of the first and second location estimates as a location of the user at the first time instant, and (ii) one of the third and fourth location estimates as a location of the user at the second time instant. The system may include the INS and/or another sensor and/or memory to store various received data and/or intermediate and/or final data generated as a result of processing the received data. In some embodiments, the system is installable on a mobile communication device such as a cell phone, a smart phone, a PDA, a tablet, a laptop, etc.

In another aspect, a system is provided for calibrating a map-point grid for indoor location determination. The grid includes several map points, each having a radio frequency (RF) data fingerprint being associated therewith. The system includes a receiver adapted to receive at least one of: (i) RF signal data from several RF sources, (ii) a user specified location indication, and (ii) tracking data from a sensor, the tracking data indicating a user's movement relative to a base map point. The system also includes a processor adapted to update the map-point grid based on, at least in part, at least one of (i) adjusted RF data, the received RF data being adjusted by the processor using systematic analysis thereof, (ii) the tracking data, and (iii) the location indication. The system may include the INS and/or another sensor and/or memory to store various received data and/or intermediate and/or final data generated as a result of processing the received data. In some embodiments, the system is installable on a mobile communication device such as a cell phone, a smart phone, a PDA, a tablet, a laptop, etc.

In one aspect, an article of manufacture, includes a non-transitory machine-readable medium storing instructions. Those instructions, when executed by a machine, configure the machine for calibrating a map-point grid for indoor location determination. The grid includes a number of map points, each having a radio frequency (RF) data fingerprint being associated therewith. Specifically, the instructions configure the machine to receive at least one of: (i) RF signal data from several RF sources, (ii) a user specified location indication, and (ii) tracking data from a sensor, the tracking data indicating a user's movement relative to a base map point. The instructions also configure the machine to update the map-point grid based on, at least in part, at least one of (i) adjusted RF data, the received RF data being adjusted using systematic analysis thereof, (ii) the tracking data, and (iii) the location indication.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention. The methods and systems may be better understood from the following illustrative description with reference to the following drawings in which:

FIG. 6 illustrates calibration of a map-point grid using sensor data, according to an illustrative embodiment;

DETAILED DESCRIPTION

To provide an overall understanding of the invention, certain illustrative embodiments will now be described, including systems and methods for indoor geolocation and calibration of a fingerprint database/map-point grid. However, it will be understood by one of ordinary skill in the art that the systems and methods described herein may be adapted and modified as appropriate for the application being addressed and that the systems and methods herein may be employed in other suitable applications, and that such other additions and modification will not depart from the scope thereof.

Figure 1A:
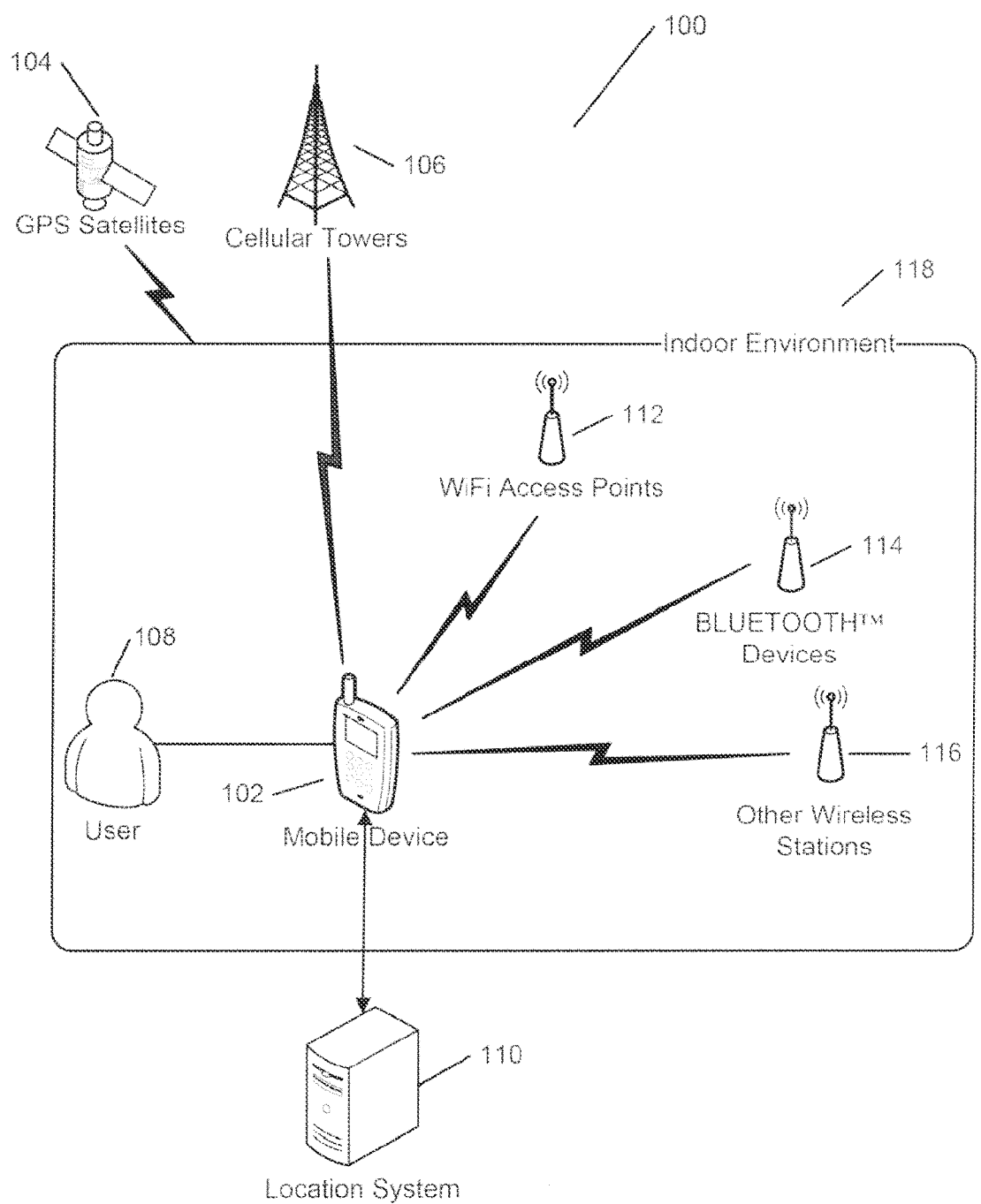
FIG. 1A schematically depicts an indoor geolocation and calibration system according to an illustrative embodiment.
Figure 1B:
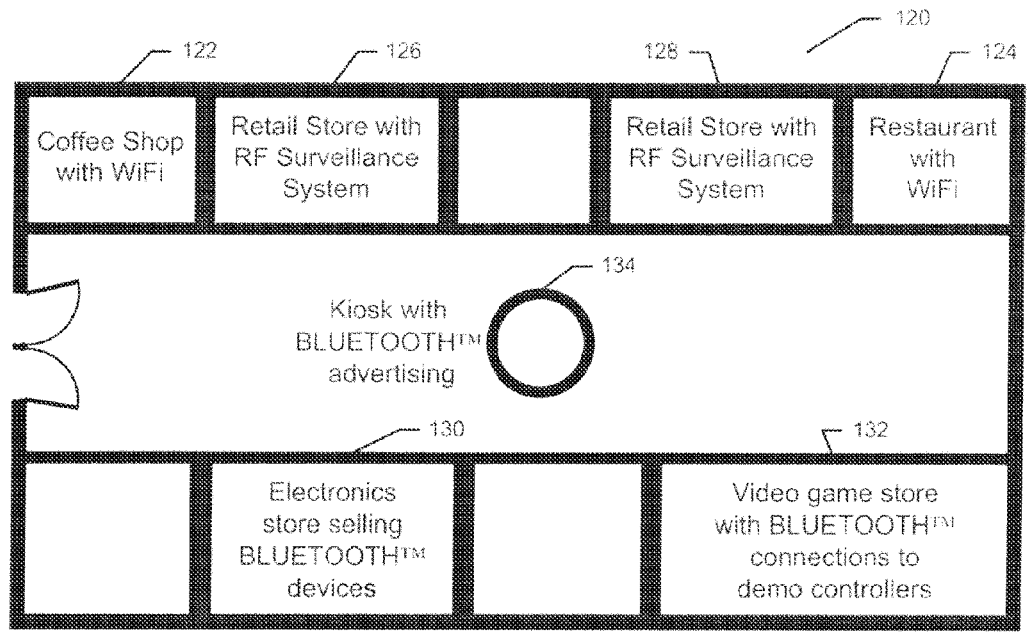
FIGS. 1B and 1C depict maps of exemplary indoor environments in which various illustrated embodiments can perform location determination and/or calibration.
Figure 1C:
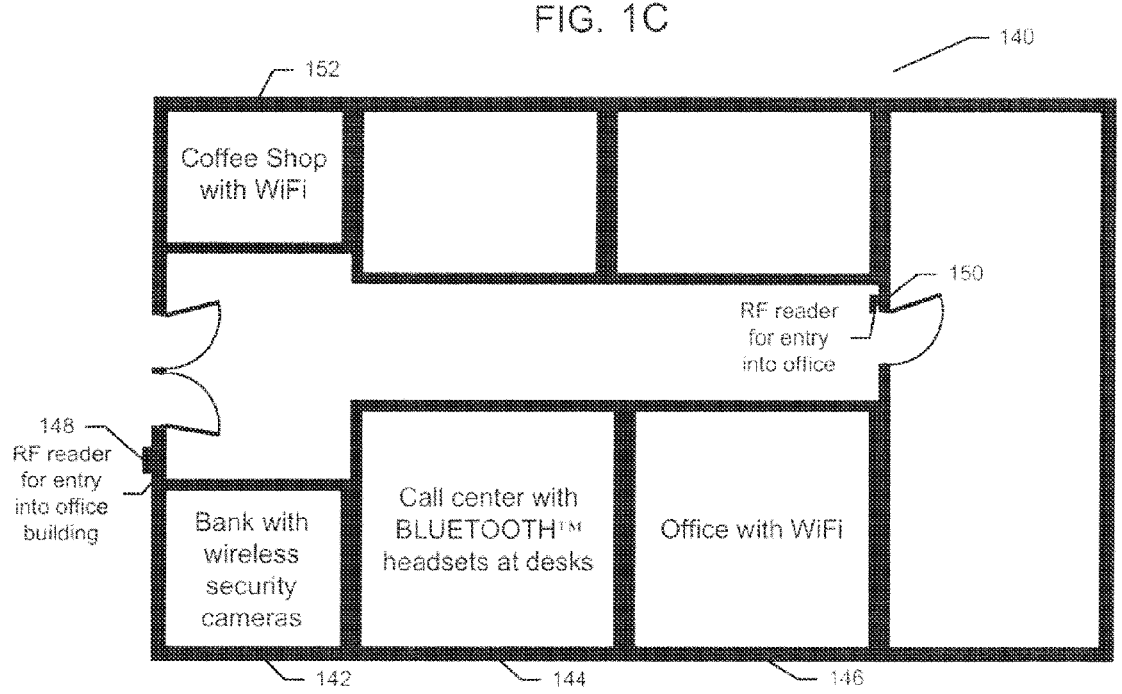

FIG. 1A is a schematic diagram of a system 100 for indoor geolocation, i.e. determining one's location in an indoor environment, according to an illustrative embodiment of the invention. FIG. 1B and FIG. 1C are examples of maps of indoor environments in which the system 100 may be used. The indoor geolocation system 100 includes a mobile device 102 and a location system 110. The user 108 uses the mobile device 102 to determine his location within an indoor environment 118. The mobile device 102 enables this by monitoring identifiable wireless radio frequency (RF) signals received over a period of time and transmitting the wireless signal data to the location system 110. The data collected by the mobile device 102 includes, for each signal detected, the signal source's identification information, such as a MAC or EUI identifier or the signal's frequency; the signal's average signal strength; the standard deviation of its signal strength; and its yield, which is a measure of how often the signal is detected over a given time period, such as 60 seconds, or how many times the signal is detected over a number of observations, such as 60 observations. When monitoring, the mobile device 102 collects a plurality of samples, or "polls", of the detectable signals. For example, one instance of signal monitoring may contain 60 polls over a duration of 60 seconds, with one poll taken per second, though the frequency of polling and the overall time during which signals are polled may vary without departing from the scope of the invention. Yield may be calculated as a percentage of polls in which the signal was detected, the number of polls in which the signal was detected, the fraction of polls in which the signal was detected, or the number of polls in which the signal strength was above a given power threshold, such as −90 dB. From this information, the location system 110 determines the location of the mobile device 102 and transmits that location back to the mobile device 102. The mobile device 102 displays the location to the user 108 on a graphical user interface.

As depicted in FIG. 1A, wireless signals can originate from WiFi access points 112, BLUETOOTH™ devices 114, and/or other RF wireless stations 116, which may include ZIGBEE™ devices, RFID readers, or any such device which emits a wireless signal, if the mobile device is equipped with an appropriate receiver. Collectively, these wireless signal sources will be referred to as "signal sources." The signal sources 112-116 are already present in the indoor environment 118, so the system uses existing infrastructure and no new infrastructure is needed. The mobile device also may receive signals from cell towers 106 and/or GPS satellites 104. Cellular towers 106 can provide location information using triangulation or other methods; however, it is challenging to precisely determine one's location based on cell phone triangulation. While GPS satellites 104 send signals that may be received by the mobile device 102 while it is outside of the indoor environment 118, GPS signals do not usually effectively reach such devices inside most indoor environments. Therefore, rather than relying solely on cellular and GPS signals, the system 100 as described herein will also utilize WiFi, BLUETOOTH™, and other RF wireless signals within the indoor environment 118 for precise, reliable indoor geolocation.

The mobile device 102 is depicted as a mobile wireless device such as a cell phone or smart phone. However, it may be any portable device, such as a laptop, notebook, tablet computer, palm-sized computer, or any electronic device with capability to receive wireless signals.

FIGS. 1B and 1C are two examples of maps of indoor environments inside of which the user 108 could use the indoor geolocation system 100. FIG. 1B depicts a map of a shopping mall 120 containing a typical blend of retail stores, eateries, and kiosks. The shopping mall 120 includes a variety of wireless signals that may be present within a typical mall, which can be used by the mobile device 102 and location system 110 to determine the location of the mobile device 102 within the mall. The coffee shop 122 and restaurant 124 both provide WiFi access to customers. These WiFi signals, identified by the MAC addresses encoded therein of their source devices, can be received by the mobile device 102 from FIG. 1A when the mobile device is within range of the signal sources.

The retail stores 126 and 128 utilize an electronic article surveillance system using RF signals to prevent theft. RF article surveillance systems typically have a transmitting antenna on one side of a doorway and a receiving antenna on the other. When a product with an active RFID tag passes through the doorway, the tag responds to the signal sent from the transmitter antenna and a different signal is sent by the tag. This signal from the tag is received by the receiving antenna, and store employees are alerted. Since the transmitting antenna of an RF article surveillance system is constantly emitting a signal, the mobile device 102 can detect these RF signals when within range and use its frequency band to distinguish it from other signals.

The electronics store 130 likely stocks a variety of devices emitting wireless signals. In the illustrative embodiment, the electronics store 130 is showcasing BLUETOOTH™ devices, such as headsets, computers and peripherals, television boxes, and alarm clocks. The video game store 132 also has BLUETOOTH™ technology on display, in this case video game consoles with wireless controllers used for gaming systems such as Nintendo WII™, Microsoft XBOX™, or Sony PLAYSTATION™. The BLUETOOTH™ receiver on the mobile device 102 detects these signals from the electronics store 130 and the video game store 132 when they are within range and uses their device names or other transmitted information to identify them.

The kiosk 134 uses BLUETOOTH™ advertising to send messages to customers in the area. BLUETOOTH™ advertising is a method of mobile advertising in which a transmitter sends a message to mobile devices in its vicinity asking whether the user of the mobile device would like to receive an advertisement. Should the user opt to receive the advertisement, a message, such as a text message, video clip, or animation is sent to the mobile device via the BLUETOOTH™ connection. When the mobile device 102 is within range of the BLUETOOTH™ advertising transmitter at kiosk 134, it will receive the signal and can access the typical BLUETOOTH™ identifiers such as device name of the transmitter.

FIG. 1C depicts a map of an office building 140 containing offices and several services typically found within a large office building. A person who wants to enter the office building 140 must first pass an access point equipped with an RF reader 148, also known as an RF interrogator. The rightmost office has an additional RF reader 150 restricting access to employees of that office only. These RF readers work with passive RFID tags by emitting a signal that would excite an RFID tag within range to transmit its ID back to the reader. Since the RF readers 148 and 150 are constantly emitting signals, the mobile device 102 can detect the signals when they are within range for use in indoor geolocation.

At the entry to the office building 140 is a coffee shop 152 that provides WiFi to its customers. This is similar to the coffee shop 122 in the shopping mall. A bank 142 is also at the entry to the office building. This bank uses wireless security cameras to monitor activities in the bank. Wireless security cameras often send digital signals to a receiver over wireless local area networks. The mobile device 102 can use the MAC addresses to identify the wireless security cameras and/or the receiver.

The office building 140 has a call center 144 as one of its tenants. This call center's representatives use BLUETOOTH™ headsets coupled with base stations. Similar to the electronics store 130 and video game store 132 that both emitted BLUETOOTH™ signals, the mobile device 102 can use the BLUETOOTH™ signals emitted from these headsets and base stations for indoor geolocation. Another tenant is an office with WiFi 146. The mobile device 102 can use the office's WiFi signal for indoor geolocation similarly to how it uses WiFi signal from the coffee shops 122 and 152 and the restaurant 124.

Figure 2:
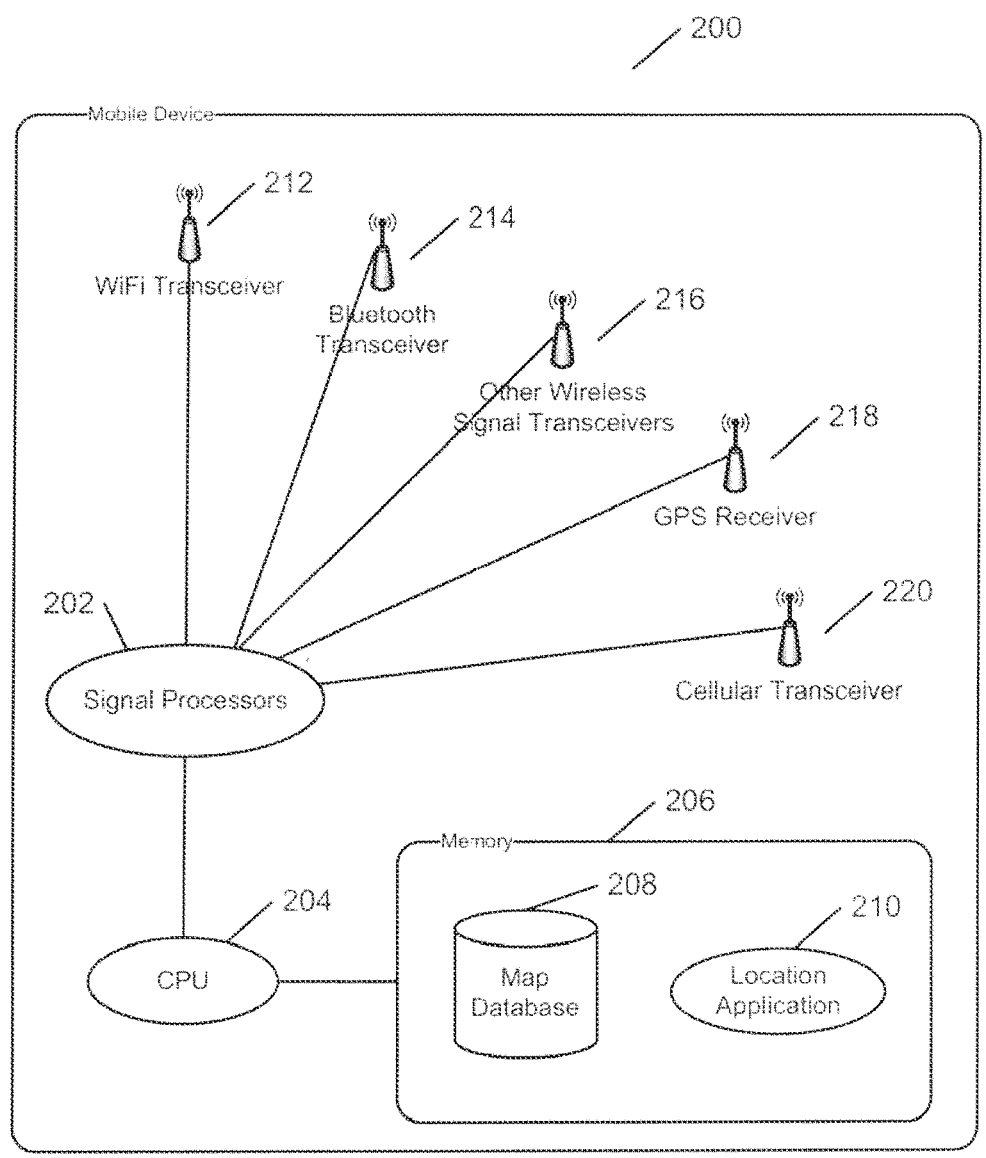
FIG. 2 is a schematic diagram of a wireless device which can be a stand-alone indoor geolocation system, according to an illustrative embodiment.

FIG. 2 is a schematic diagram of the mobile device component 200 of an alternative embodiment of an indoor geolocation system. Unlike in system 100, the mobile device 200, rather than the remote location server 110, determines the mobile device's location. To do this, the memory 206 of the mobile device 200 contains both a database of maps 208 and a location application 210 used to determine and display the mobile device's location. The location application 210 includes a graphical user interface (GUI), a locator process, and a wireless monitoring process. The map database 208 includes maps for all locations for which the indoor geolocation system has been trained. In the case of multi-floor buildings, there is a separate map associated with each floor. The mobile device 200 may only store a subset of the full map database in its memory, based on location information obtained through GPS satellites or cell towers, user input, or through other means. The map database 208 could be received and/or updated through a mobile phone provider's network, through a WiFi connection, through a physical connection to a computer, or through other means. When the location application 210 is run, though, it references a map database 208 stored within the memory 206 of the mobile device 200 rather than interacting with a remote location system.

The mobile device 200 contains several receivers and transceivers, including WiFi transceiver 212, BLUETOOTH™ transceiver 214, other wireless RF signal receivers or transceivers 216, GPS receiver 218, and cellular transceiver 220. These receivers and transceivers receive external wireless signals from signal sources 104, 106, and 112-116 depicted in FIG. 1A. The mobile device 200 also includes signal processors 202, such as analog to digital converters, digital signal processors, or any such processor required to process and characterize the wireless signals received. The mobile device 200 also includes a CPU 204, which receives information about the detected wireless signals through the signal processors 202 and executes the location application 210 stored in memory 206 to determine the location of the mobile device 200 using the signal information.

When the user 108 runs the location application 210, the mobile device 200 collects data over a period of time from the wireless signals it detects within range using the transceivers 212-218 to obtain for each signal detected the source signal's identification information, such as a MAC or EUI identifier or the signal's frequency; its average signal strength; its standard deviation of the signal strength; and its yield, as defined above. Suitable periods of time include, without limitation, 10 seconds, 20 seconds, 30 seconds, 40 seconds, 50 seconds, or 60 seconds. The location application then processes the signal, as described with reference to any of FIGS. 4 through 11, to determine and output the user's location on a display of the mobile device through the graphical user interface (GUI) provided by the location application, and/or to calibrate the fingerprint database/map-points.

Figure 3:
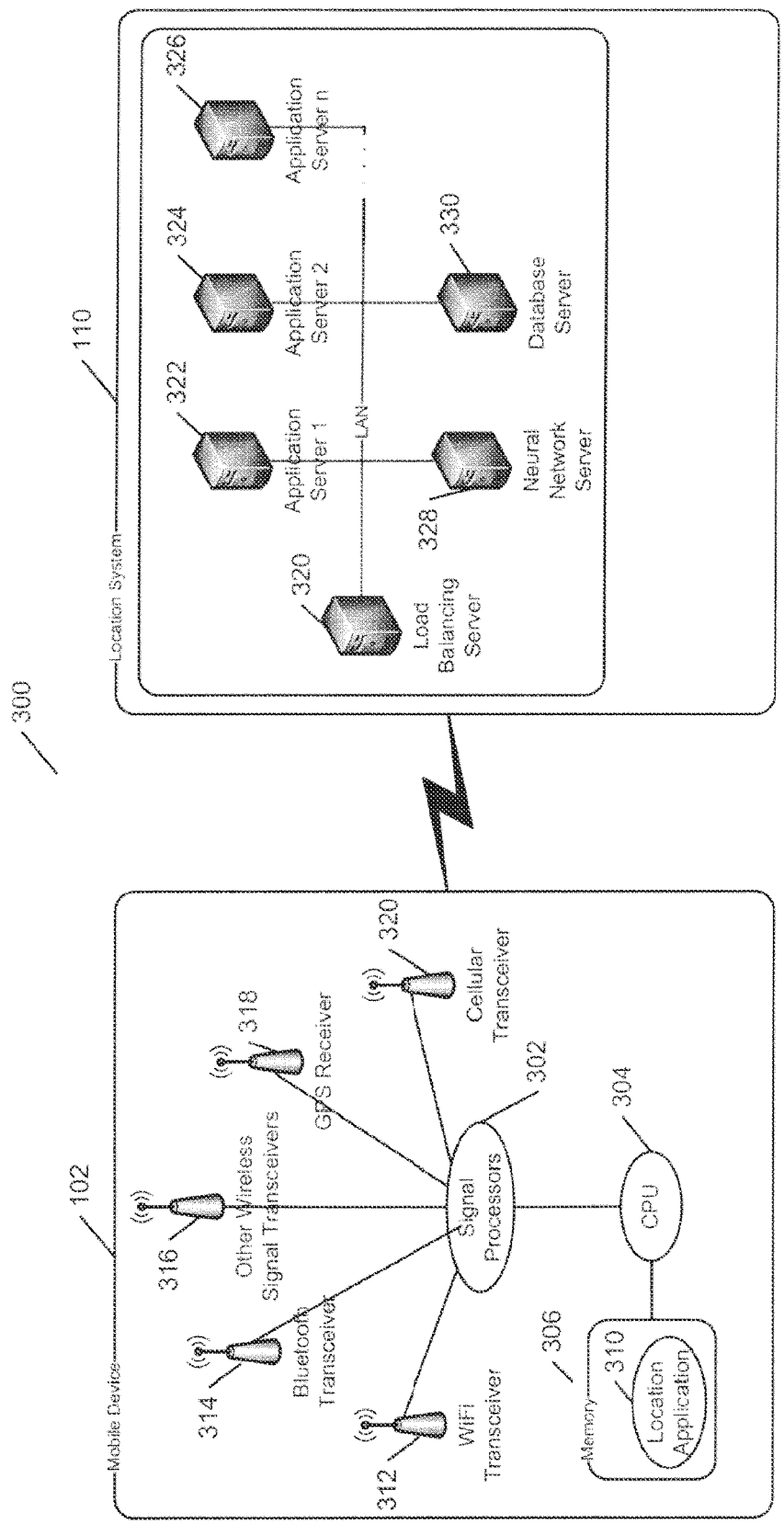
FIG. 3 is a schematic diagram of a client-server architecture-based indoor geolocation system, according to an illustrative embodiment.

FIG. 3 is a schematic diagram of an alternative indoor geolocation system 300, according to an illustrative embodiment of the invention similar to the system of FIG. 1, in which the remote location system 110 determines the location of the mobile device 102 and transmits the location to the mobile device for display. The mobile device 102 is similar to mobile device 200, except the mobile device 102 does not have a map database in its memory, and the location application 310 on the mobile device 102 does not include the locator process to determine the location of the mobile device 102. The mobile device includes a WiFi transceiver 312, BLUETOOTH™ transceiver 314, other wireless signal transceivers 316, GPS receiver 318, and cellular transceiver 320 similar to receiver/transceivers 212-220 in mobile device 200 of FIG. 2. The mobile device 102 also includes signal processors 302, which handle the outputs of these receivers/transceivers in the same fashion as the signal processors 202.

The location application 310 in mobile device 102 includes computer executable instructions for displaying a GUI in the display of the mobile device, accepting input from the user 108 via the GUI, monitoring the available wireless signals 104, 106, and 112-116, sending the data outputted from the signal processors 302 to the location system 110, accepting the output from the location system 110, and displaying the location on the mobile device 102 to the user 108 via the GUI.

The location system 110 accepts data sent from the mobile device 102 from the monitoring of the signal sources 112-116. The monitoring results for each signal include the source signal's identification information, such as a MAC or EUI identifier or the signal's frequency; its average signal strength; its standard deviation of the signal strength; and its yield.

The location system 110 includes a variety of servers: application servers 322-326, which perform the analysis of the data received; neural network server 328, which takes the processed data output by one or more application servers and uses a neural network to determine the location of the mobile device; database server 330, which stores databases used by the other servers, such as a database of all possible maps; and load balancing server 320, which balances the processing load between the servers, particularly application servers 322-326. Each of the servers is attached to the local area network (LAN) connecting the components of the location system 110. Once the location system 110 has determined the location of the mobile device, the result is sent back to the mobile device 102 to be displayed to the user 108.

Figure 4:
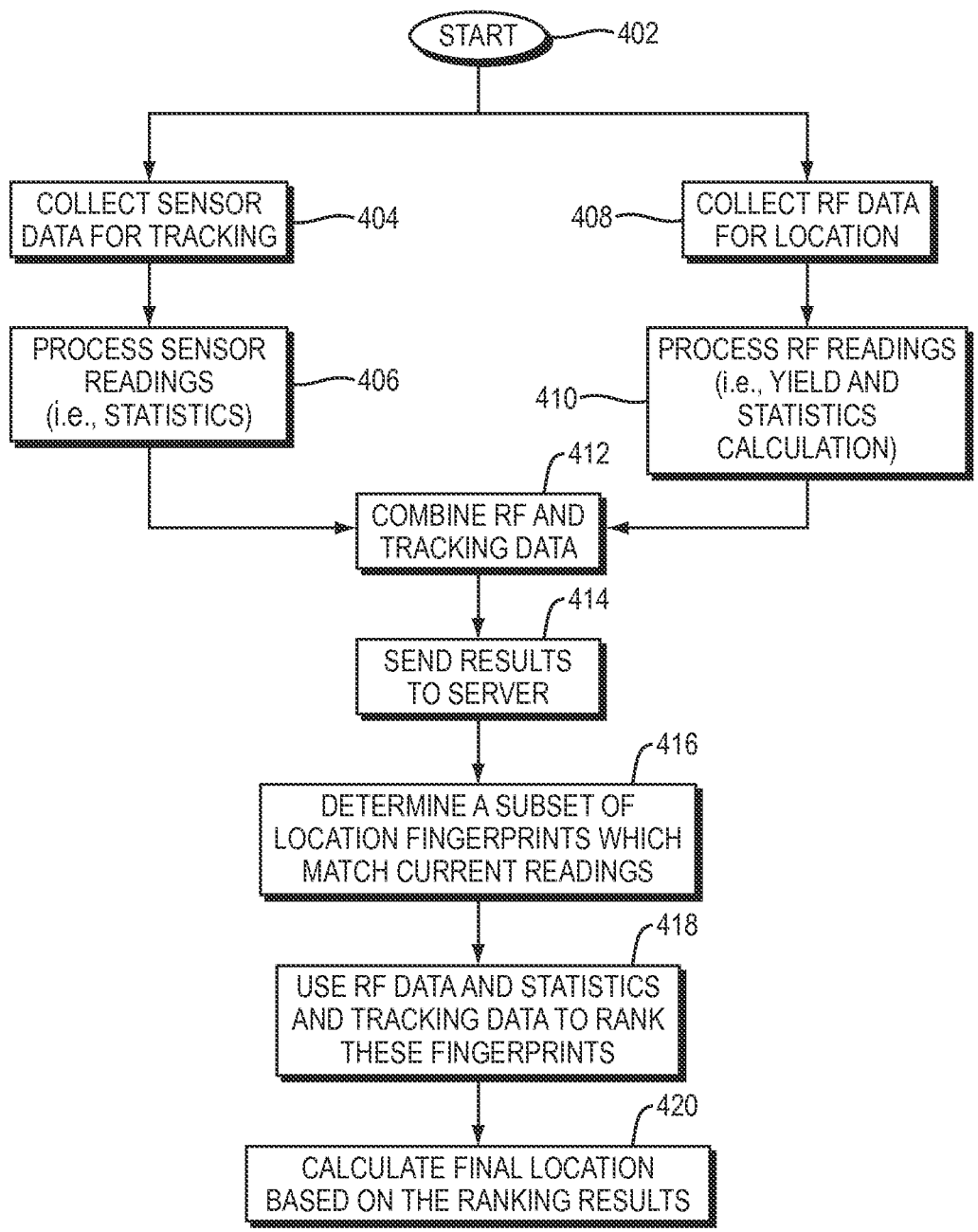
FIG. 4 depicts a flow chart of indoor location determination using sensor data, according to an illustrative embodiment.

With reference to FIG. 4, a user's location can be determined using a combination of RF and tracking data. We track a user's inertial movements at step 404, using one or more inertial navigation sensors (INS) such as accelerometer, gyroscope, etc., and sensors in general, such as a barometer, and use the estimated inertial movement to update location estimates that are based on RF readings. The INS can be installed in the user's device such as a cellphone, tablet, BlackBerry, etc. In the context of location determination, in some embodiments the user is not a calibrator, while in some embodiments, the user is one who seeks location information and also supplies data for calibration. The INS data are processed at step 406, e.g., to obtain statistical information such as mean and standard deviation of velocity and/or angular momentum.

RF data are recorded in step 408 and processed, e.g., to determine yield and/or other statistical parameters, in step 410. The sensor and RF data may be combined in the user's device at step 412 and sent to a server at step 414. In some embodiments, the user's device is configured to perform the steps 416 through 420. The server and/or the user device selects from a database/map-point grid a subset of location fingerprints that match the current RF readings recorded in the step 408. The subset selection may also be based on the yield associated with the RF source used in synthesizing the fingerprints.

In step 418, the INS data are used to rank the selected fingerprints. For example, the fingerprints of four map points A, B, C, and D may match the RF data, but the INS data may suggest that the user is not near the map point C, for example. In that case, the fingerprint associated with the map point C is underweighted or ranked lower than some or all of the other fingerprints. In step 420, the user's location is determined according to the weighted or ranked fingerprints. In some embodiments, underweighting includes setting the weight to about zero, so that the corresponding fingerprint from the subset (e.g., fingerprint associated with the map point C in the example above), is effectively omitted in determining the user's location.

In some embodiments, in addition to performing the steps 414 through 420, or alternatively, the INS data are used to determine a user's location between periodic scans. For example, the location is determined based on the observed RF data and the fingerprint data when the scan is performed. Between two consecutive scans, however, the location is determined using the INS data.

In some embodiments, more than one estimates of the user's location are obtained using the RF data and the fingerprint database. These estimates can be ranked, and one or more estimates can be eliminated, based on the tracking data obtained from the INS. For example, if the INS data indicate that the user moved 10 feet in a certain direction, estimates of locations that are not within 10 feet in that direction from the previous location may be underweighted or eliminated.

Figure 5:
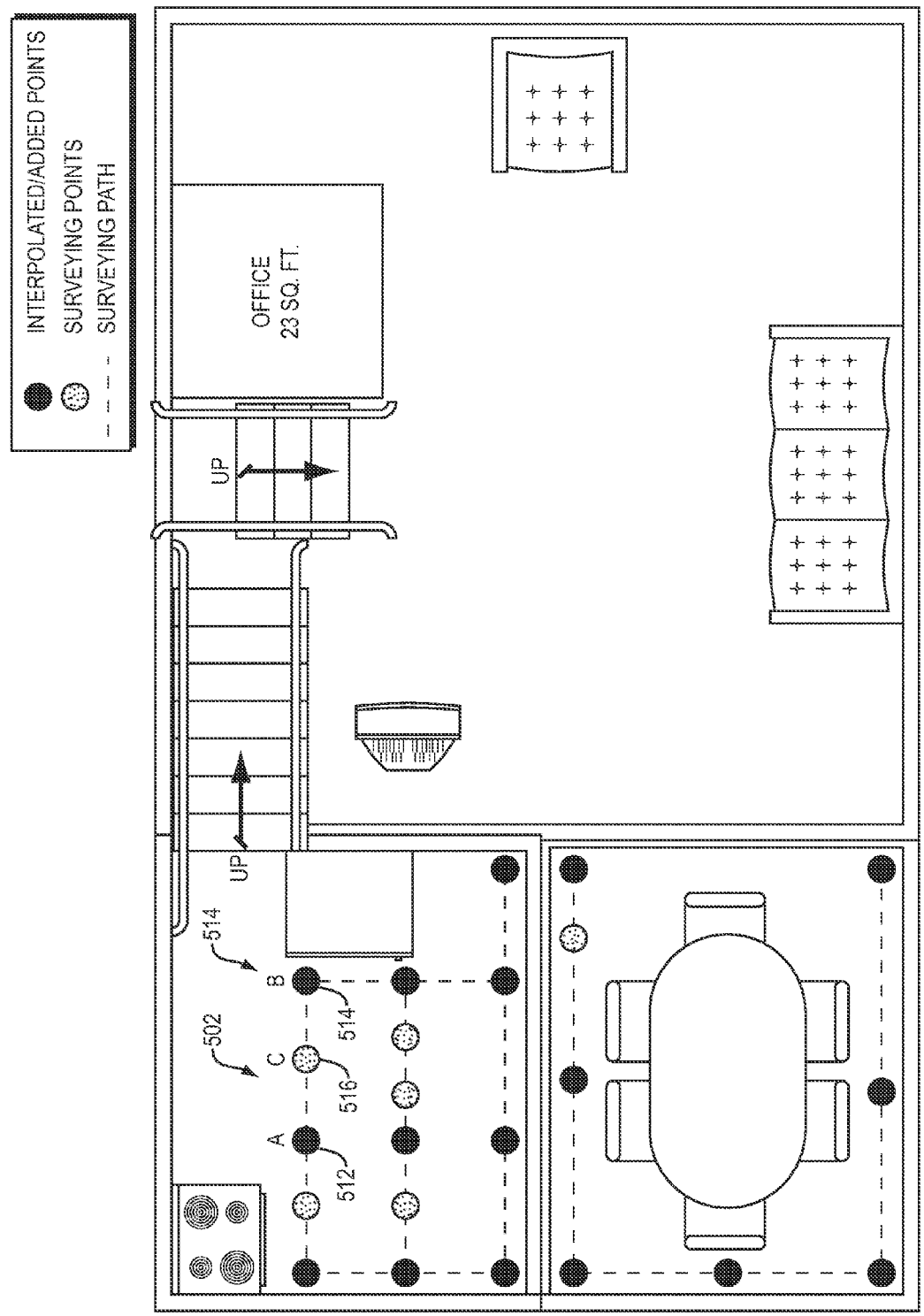
FIG. 5 illustrates calibration of a map-point grid, in which a new map point is added to the grid, using sensor data, according to an illustrative embodiment.

In the context of calibration, a "location grid" in general includes locations at a granularity that may be finer than that of a map-point grid. Thus, at least initially, a location grid may include more location points than the number of map points on a corresponding map-point grid. With reference to FIG. 5 points A, B, and C, for example, are location points on a location grid 502. Initially, only points A and B are map points 512, 514 on a map-point grid 504, as well. When a fingerprint is computed and associated with the location point C, as described below, the location point C also becomes a map point 516, and is then included in the updated or calibrated map-point grid 504. It should be understood that points A, B, and C are illustrative only, and that in general both location and map-point grids may include fewer and or more (typically tens, hundreds, etc.) location and map points, respectively. It should also be understood that during calibration of a map-point grid, all location points may not be updated as map-points.

In calibrating the map-point grid 504 (that does not initially include the map point 516) for indoor location determination a location of a user/calibrator is determined based on, at least in part RF signal data and received tracking data. In the map 502, the user marks location at point A (indicating that the user is located at point A), begins scan, walks to point B, stops scan, and marks point B. We use inertial data to create a fingerprint at point C and assign RF data to point C for the scan that occurred at the moment when our inertial data indicates user was at point C.

In one embodiment, calibration of a map-point grid for indoor location determination can be performed by computing a spatial and directional orientation of the user while the RF data are scanned. That information is then used to update and/or synthesize a fingerprint associated with a map point. Scans are performed during different time periods, and for each time period, we capture RF data and the user's spatial and directional orientation and we use individual scan parameters and aggregate scan parameters to update data associated with original fingerprint or compute a new fingerprint. Specifically, the INS data may be used to determine if the user is: (i) standing still, and (ii) facing in a desired direction, etc. If one or more of these conditions are not met, the computed fingerprint may be rejected during calibration. In one embodiment, in updating a fingerprint based on the INS data, a weight is associated to that fingerprint and the fingerprint is then used according to that weight.

With reference to FIG. 6, in one embodiment, three scans are performed during time periods S1, S2, and S3. During the period S1, it is determined that the user's orientation 602 was generally 345° with respect to a reference (not shown), and that the user was turning, changing orientations in a range 612. An acceleration factor corresponding to the movement was about 1. During the period S2, it is determined that the user's orientation 604 was generally 225° with respect to the reference, and that the user was changing orientations in a range 614. An acceleration factor corresponding to the movement in the period S2 was also about 1. During the period S3, it is determined that the user's orientation 606 was generally 135° with respect to the reference, and that the user was changing orientations in a range 616, with a corresponding acceleration factor of about 0.9. It was also observed that during the period S1, RF powers from access points AP1, AP2, and AP3 were observed to be about −85 dB, −90 dB, and −75 dB, while during the period S2, the powers from the same set of Aps were observed to be −84 dB, −89 dB, and −77 dB, respectively.

By comparing the observed orientation with a specified orientation (e.g., an orientation according to which the user would directly face one of the APs), an RF data set corresponding to a certain time period may be rejected, or a low weight, indicating that the data are less reliable for calibration, may be assigned to that RF data set. The weights and/or decision to reject a data set can also be based on the other observed characteristics such as whether the user was steady during the scan or was moving quickly, in a random manner, as indicated by acceleration or angular velocity factors. Using the RF data that are not rejected, a new fingerprint may be synthesized based on the weights assigned to the RF data. In some embodiments, the sensor data are used to adjust the weight assigned to a previously computed fingerprint.

Figure 7:
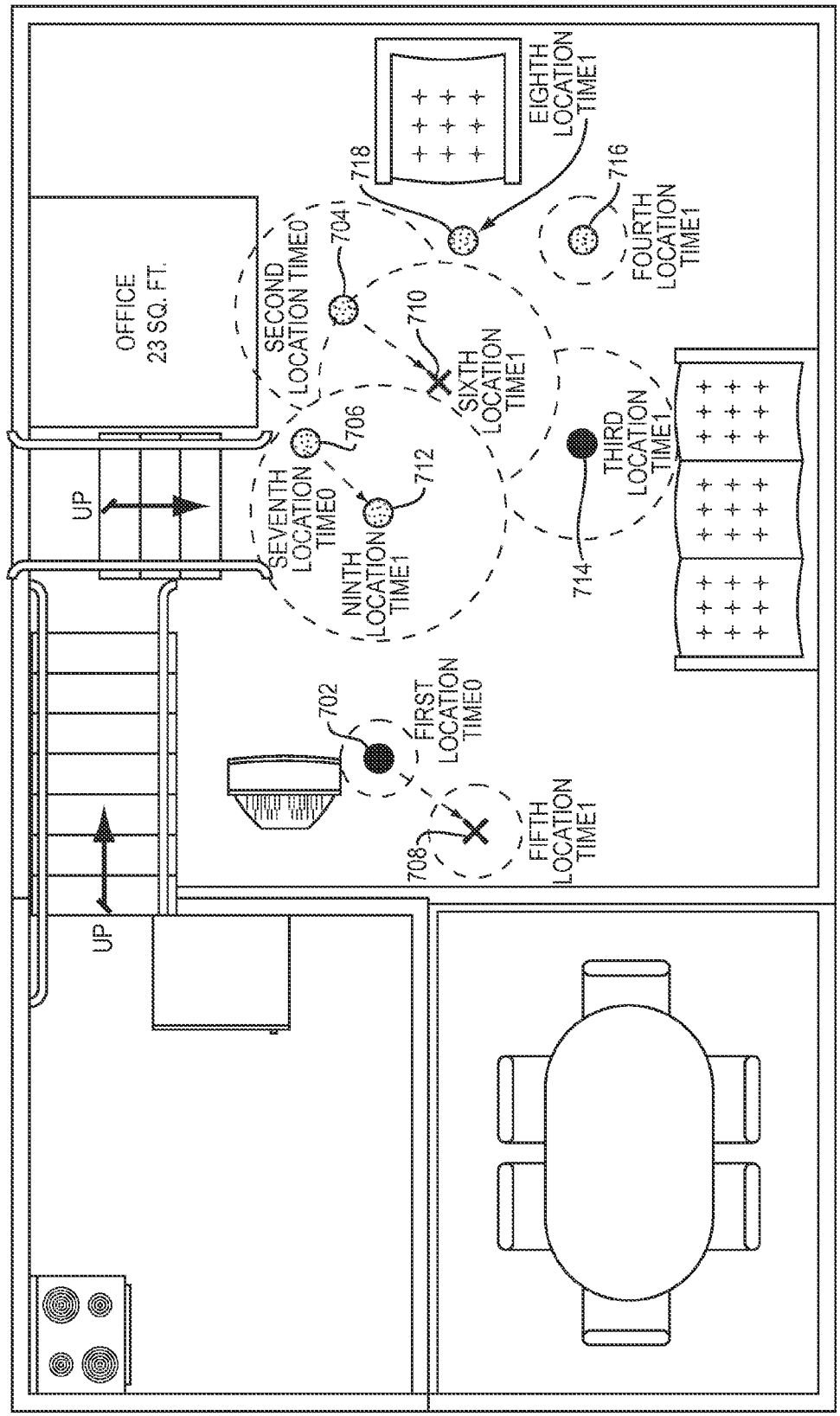
FIG. 7 illustrates indoor location determination using sensor data, according to an exemplary embodiment.

A location of a user (who may or may not be a calibrator) can be determined within an indoor environment by using both RF data and tracking data from an inertial navigation system. With reference to FIG. 7, at time t0, we use RF data to estimate user location. The estimation suggests that user may be in any one of locations "First" 702, "Second" 704, and "Seventh" 706 at time t0. The three estimates are illustrative; in other embodiments fewer (e.g., one or two) or more (e.g., four, seven, etc.) estimates may be obtained at time t0 based on RF data. One of these three estimates "First," "Second," and "Seventh" is likely to be more accurate than the others. For example, the user may, in fact, be at or near the location 2.

At time t1, the user has moved. Tracking data from the INS indicates that the user may be at one of the locations "Fifth" 708, "Sixth" 710, or "Ninth" 712. For example, assuming that the user was at the location "First" 702 at time t0, based on the INS data, the user is estimated to be at the location "Fifth" 708. Instead, if the user is assumed to be at the location "Second" 704 at time t0, according to the INS data, the user is estimated to be at location "Sixth" 710 at time t1, and at location "Ninth" 712, if the user is assumed to be at location "Seventh" 706 at time t0. Once again, at time t1 one of the location estimates "Fifth," "Sixth," and "Ninth" is likely to be more accurate than the other ones.

We also use RF data at time t1 to estimate the user's location to be "Third" 714, "Fourth" 716, or "Eighth" 718. A comparison of the RF-data-based location estimates "Third," "Fourth," and "Eighth" and INS-data-based location estimates "Fifth," "Sixth," and "Ninth" is used to determine the most likely location of the user at time t1 and also at time t0. For example, the estimated locations "Sixth" 710 and "Eighth" 718 are closest to each other, and as such, one of these two estimates (i.e., "Sixth" and "Eighth") is likely to be the most accurate estimate at time t1.

It should be understood that the difference between pairs of estimates is only one method of determining the accuracy of an estimate. Other methods—such as assigning a quality score to the individual points based on weighting statistics such as standard deviation of accelerometer data and number of access points visible, or clustering points to determine which is more likely to be representative of location at t0 based on its proximity to all of the other potential points—may also be used to select one of the various location estimates obtained at time t1 to be the most likely location of the user. In some embodiments, the locations estimated from the INS data are not compared with the locations estimated from the RF data. Instead, only the RF data based estimates are compared with each other, based on the quality scores to determine the one that is most accurate. In other embodiments, the locations estimated from the INS data are compared with the locations estimated from the RF data, and in addition, other factors such as a quality score for the INS data and/or a quality score for the RF data are also considered. Moreover, we apply an error metric comprised of type of the building, number of RF sources at each RF reading, strength of RF data, yield of each RF source, tracking data from device, and other statistics associated with RF and tracking data and use it to validate which of the location estimates "Third" 714, "Fourth" 716, or "Eighth" 718 is more accurate.

Figure 8:
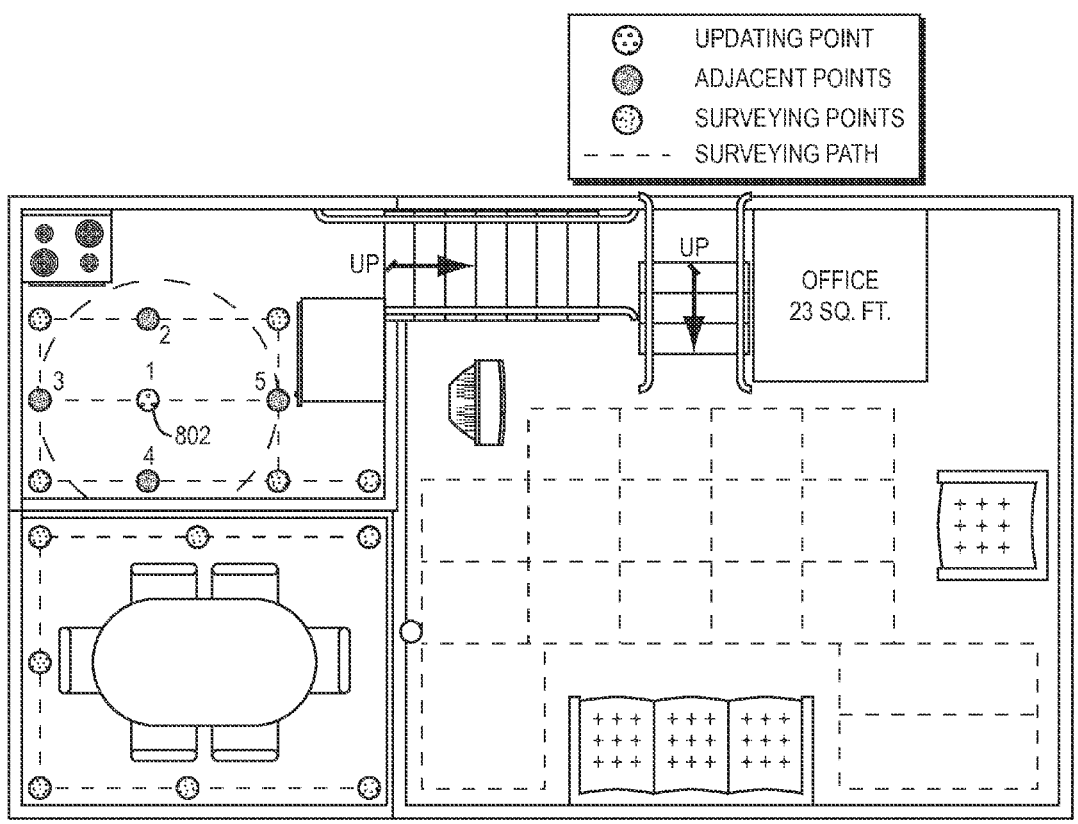
FIG. 8 illustrates calibration of a map-point grid, in which a fingerprint associated with a map point is adjusted using analysis of fingerprints associated with other map points, according to an illustrative embodiment.

With reference to FIG. 8, a map-point grid for indoor location determination is calibrated by updating the received RF signal data at a map point with RF signal data received at other map points. Point 1 is a map point that has a fingerprint associated therewith. Points 2-5 represent a set of other points that are within a set threshold distance (e.g., less than ten feet, tens of feet, etc.) from Point 1. Fingerprints are associated with each of Points 2-5. We update the fingerprint statistics for Point 1 by averaging fingerprint statistics from Points 2-5. For example, rather than just relying on the RF data scans corresponding to Point 1 to determine power and yield for each AP observed during that scan, we account for the additional scans from Points 2-5, and update the RF and/or fingerprint data associated with Point 1 with the scan data associated with the additional scans. This can smooth out any erroneous or spurious data, if present, in the scan corresponding to Point 1, thereby improving the quality of the overall fingerprint database. It should be understood that a set that includes four additional points is illustrative only, and that in general, a set used for smoothing may include as few as one and more than four (e.g., 6, 10, 20, etc.) additional map points.

Figure 9:
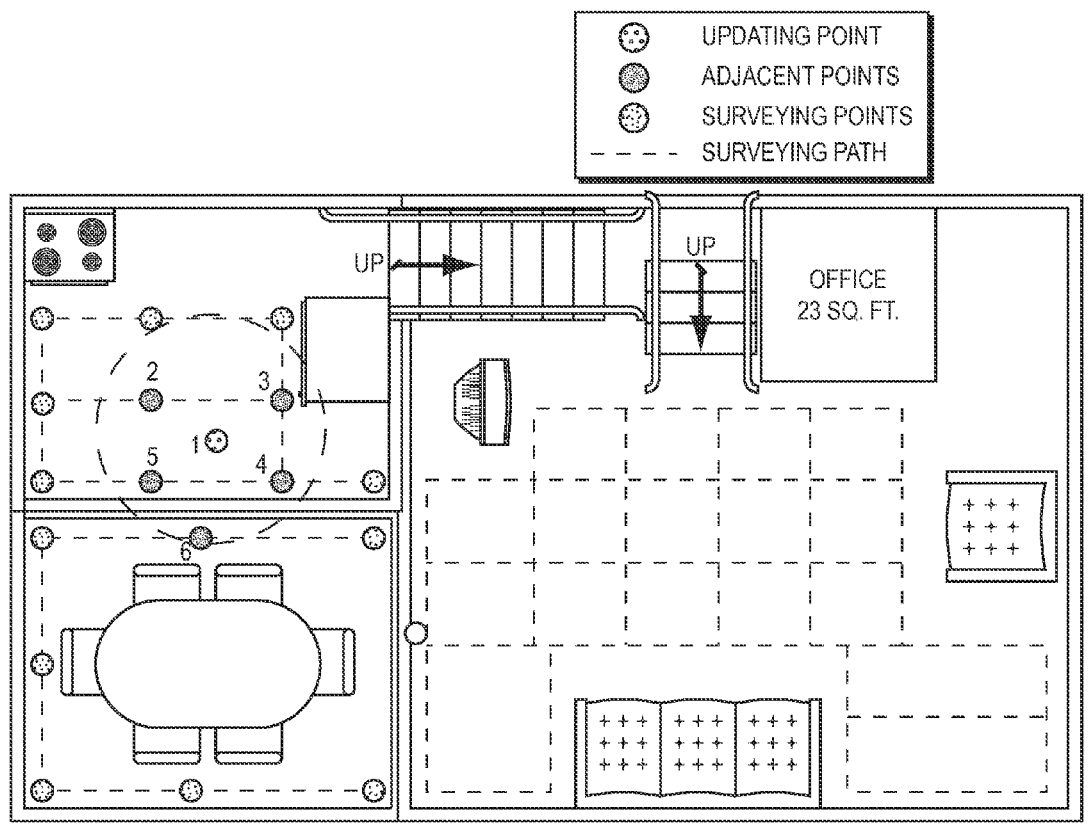
FIG. 9 illustrates calibration of a map-point grid, in which a new map point is added to the grid using analysis of fingerprints associated with other map points, according to an illustrative embodiment.

With reference to FIG. 9, a map-point grid for indoor location determination is calibrated by computing a new fingerprint at a given map point as a function of fingerprints associated with other map points. For example, Point 1 represents a point that does not have an associated fingerprint in the database/grid. Points 2-6 represent points within a set threshold distance from Point 1, as described with reference to FIG. 8. Fingerprints are associated with each of Points 2-6. We use fingerprint statistics from Points 2-6 (e.g., access points (APs) seen, power, yield, etc.) to compute a new fingerprint for Point 1, and assign the computed fingerprint to Point 1, thereby updating the fingerprint database/map-point grid. It should be understood that a set that includes five additional points is illustrative only, and that in general, a set used for creating a new fingerprint may include as few as one and more than five (e.g., 8, 10, 15, 20, etc.) additional map points.

In performing a calibration, a person typically marks a calibration point on a map displayed on a user device (e.g., a phone app) and then takes sensor readings, e.g., RF signal data, inertial navigation data, etc., using the device. There is a risk, however, especially when the user/calibrator is unskilled that the person made an error in recording data. For example, the user may mark his or her location as point A on the map, when the person is actually standing at point B. Various measures are taken that, individually or in combination with one or more other measures, can reduce the impact of such errors on the quality of the fingerprint database.

Figure 10:
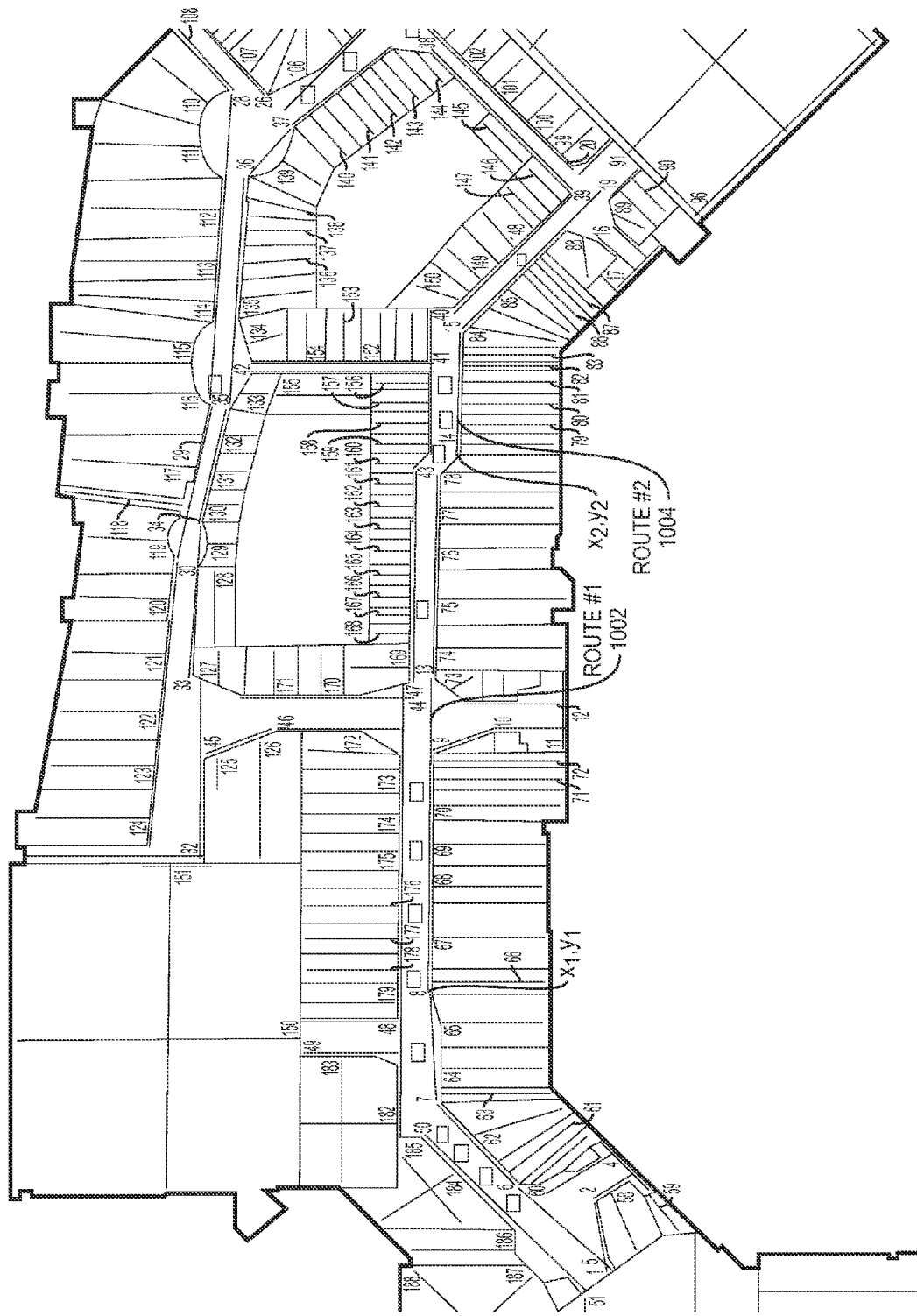
FIG. 10 illustrates calibration of a map-point grid using pre-selected routes, according to an illustrative embodiment.

As depicted in FIG. 10, we pre-populate our maps with numbered and/or labeled calibration routes, such as Route #1 1002, Route #2, 1004, etc., that users must take when conducting calibrations. Any user may take one or more routes, and different users may repeat one or more of the pre-designated routes. The user can identify the route being calibrated by providing the name and/or number of the route or by selecting a route from a list displayed on the user's device. The user can also identify a location on the route or associated therewith, e.g., by tapping on that location in a map displayed on the user's device.

Each route corresponds to at least one map point, such as a starting map point, an ending map point, or another map point. We compare a location the user specified while taking a calibration against the location of a map point associated with the route, as recorded in a database. For example, if a user marked "Route #2" starting at x1, y1, but our database specifies that Route #2 starts at x2, y2, it can be determined that the user may have made an error in recording data. Accordingly, we can reject/underweight the calibration scan by that user corresponding to Route #2, so as to improve the quality of the fingerprint database by excluding/underweighting data that may be erroneous.

We may also receive multiple calibrations for each route, from the same or different users. If the RF data in one of the scans (e.g., Scan #7 from twelve scans) is substantially different than the data recorded in the other eleven scans, it can be determined that Scan #7 may be erroneous, and the data recorded during that scan may be excluded or underweighted. If only a few scans (e.g., three scans) were performed for a certain route, and if the second and third calibrations for that route are different than each other, it may be decided that at least one of the three scans was erroneous. We can reject both the second and third scans, or underweight all three scans for that route.

Such a determination can be performed by comparing statistics of RF and/or sensor data for different calibrations of the same route. The statistics may related to the list of WiFi access points visible, powers of the visible WiFi access points and a variation in the recorded power, and yields of access points observable on the route. The statistics may also be related to sensor data such as a number of turns on a route, a length of a segment of the route, an orientation of a segment of the route, acceleration observable on the route, altitude associated with the route, and barometric pressure observable on the route.

Figure 11:
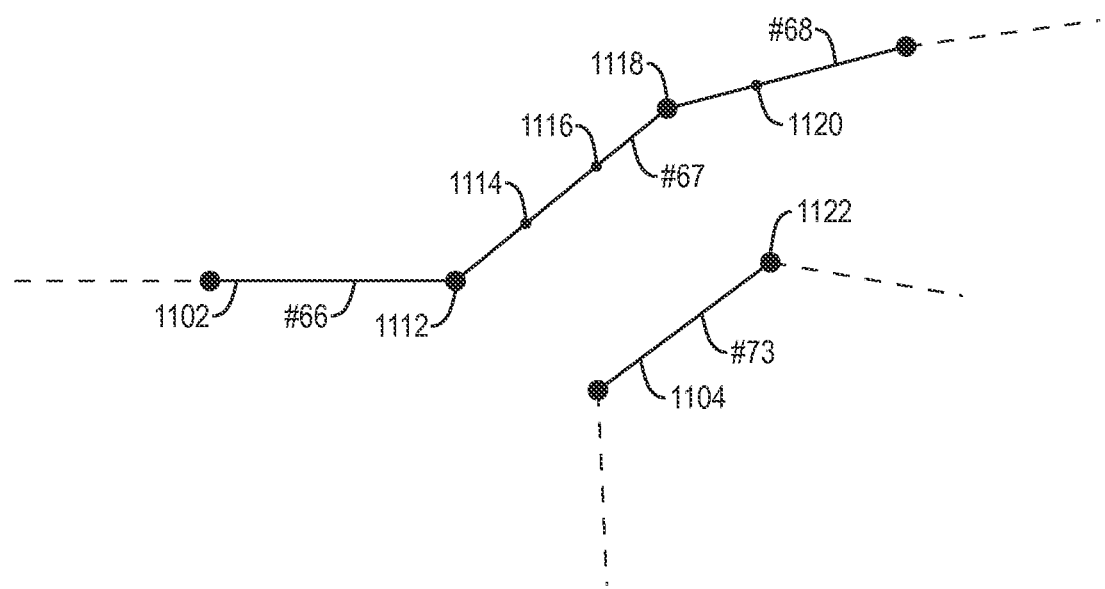
FIG. 11 illustrates calibration of a map-point grid based on, at least in part, testing using segments of a route, according to an illustrative embodiment.

In some embodiments, when a complete set of data is collected, we check the validity of each segment. With reference to FIG. 11, a route 1102 includes segments #66, #67, and #68. The route 1102 may include additional segments. The segment #67 includes map points 1112, 1114, 1116, and 1118. Embodiments in which a route includes fewer or more than three segments, and a segments that include fewer or more than four map points are within the scope of the present invention. In general, the fingerprint database includes RF data associated with scans corresponding to segment of various routes, e.g., tens or hundreds of scans. During calibration, the RF data associated with a selected segment is excluded from the fingerprint database, and instead, some of the excluded data are used as test input to the location-determination engine in a synthetic "location request." If data are collected correctly, the location returned by the engine should be within reasonable distance of the map points of the excluded segment.

For example, in one exemplary calibration, the RF data associated with the map points 1112-1118 of the segment #67 are excluded from the database. One or more of the map points 1112-1118 are selected to form a subset, and the RF data observed at the map points in the subset are provided to the location determination engine as input. In one instance, the data observed at the map point is 1114 is provided to the location determination engine. If the engine returns a location that is substantially the same as the location of the map point 1114 it can be concluded that the RF data associated with the segment #67 are valid.

In another instance, the data observed at map points 1114 and 1116 are provided to the location determination engine. If the engine returns a location that is in the middle of the locations of the map points 1114, 1116, it can be concluded again that the RF data associated with the segment #67 are valid. On the other hand, in any of these instances, if the location determination engine returns a location that is substantially different than the one expected, the data associated with the segment #67 can be discarded or underweighted. It should be noted that in some embodiments more than one subsets of the map points associated with a segment may be explored as described above, while in other embodiments, only one subset may be explored. Some or all segments in the fingerprint database may be evaluated, and weights may be assigned to the evaluated segments and/or some of the evaluated segments may be discarded from the fingerprint database.

In one embodiment, a set of segments is selected, such that each segment in the set includes a map point that is within a specified distance (e.g., a few feet, tens of feet, etc.) from a map point corresponding to the candidate segment, i.e., the segment to be excluded. For example, segment #68 of the route 1102 and segment #73 of another route 1104 include map points 1120 and 1122, respectively, that are within a specified distance from the map point 1118 of the candidate segment #67. Therefore, segments #68 and #73 are included in the set. A fitness measure based on a comparison of a fingerprint associated with the map point 1118 and map points 1120, 1122 is computed. In this embodiment, the weight associated with the map points corresponding to segment #67 is adjusted based on, at least in part, the fitness measure. This adjustment can be in addition to, or instead of the weight adjustment based on location request, as described above. It should be understood that the set of segments, in general can include only one segment or several (e.g., 5, 8, 14 segments). Similarly, more than one map points of the candidate segment (e.g., segment #67) can be compared with one or more map points of various segments in the set, in computing the fitness measure.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Use of such "microprocessor" or "processor" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network are not limited to the full Internet, and can include portions thereof. References herein to microprocessor instructions or microprocessor-executable instructions, in accordance with the above, can be understood to include programmable hardware.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems. Further, references herein to real-time can be understood to be abbreviations for "substantially in real-time." Although the illustrated embodiments of the methods and systems refer to certain aspects being in "real-time," such aspects may be provided in other manners.

Throughout the entirety of the present disclosure, use of the articles "a" or "an" to modify a noun can be understood to be used for convenience and to include one, or more than one of the modified noun, unless otherwise specifically stated.

Although the methods and systems have been described relative to specific embodiments thereof, they are not so limited. Obviously many modifications and variations may become apparent in light of the above teachings.

Many additional changes in the details, materials, and arrangement of parts, herein described and illustrated, can be made by those skilled in the art. Accordingly, it will be understood that the methods and systems provided herein are not to be limited to the embodiments disclosed herein, can include practices otherwise than specifically described, and are to be interpreted as broadly as allowed under the law.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Accordingly, we claim:

1. A method of determining a location of a user within an indoor environment, the method comprising:
   for each radio frequency (RF) source of a plurality of RF sources: (i) receiving RF signal data from the RF source, and (ii) computing a yield of the RF source based on the received data comprising computing a frequency of the received RF data over at least one of a period of time or a number of observations;
   selecting a subset of fingerprints from a database of fingerprints, based on, at least in part, the yield associated with each of the plurality of RF sources;
   receiving tracking data from an inertial navigation system; and
   determining a location of a user based on, at least in part: (i) the RF signal data received from each of the RF sources in the subset, and (ii) the received tracking data.

2. A method of determining a location of a user within an indoor environment, the method comprising:
   receiving at a first time instant, a first set of radio frequency (RF) data from a plurality of RF sources;
   computing, based at least in part on the first set of RF data, a first location estimate and a second location estimate;
   receiving at a second time instant: (i) a second set of RF data from the plurality of RF sources, and (ii) tracking data from an inertial navigation system;
   computing, based at least in part on the second set of RF data, a third location estimate and a fourth location estimate;
   computing at the second time instant: (i) a fifth location estimate based in part on the first location estimate, and (ii) a sixth location estimate based in part on the second location estimate, both the fifth and sixth location estimates also being based in part on the tracking data;
   computing an error metric by comparing: (i) the fifth location estimate with at least one of the third and fourth location estimates, and (ii) the sixth location estimate with at least one of the third and fourth location estimates; and
   designating based at least in part on the error metric: (i) one of the first and second location estimates as a location of the user at the first time instant, and (ii) one of the third and fourth location estimates as a location of the user at the second time instant.

3. The method of claim 2 further comprising:
   associating an accuracy parameter with one of the first, second, third, and fourth location estimates,
   wherein the error metric is based in part on the accuracy parameter.

4. The method of claim 3, wherein the accuracy parameter is based in part on at least one of a type of a building, number the RF sources, power of the RF source, types of the RF sources, yield of the RF sources, tracking data, and statistics associated with tracking data.

5. The method of claim 2 further comprising:
   computing: (i) a seventh location estimate based at least in part on the first set of RF data; (ii) an eighth location estimate based at least in part on the second set of RF data; (ii) a ninth location estimate based at least in part on the seventh location estimate and the tracking data,
   wherein the error metric is computed based in part on at least one of the seventh, eighth, and ninth location estimates.

6. A method of calibrating a map-point grid for indoor location determination, the grid comprising a plurality of map points, each having a radio frequency (RF) data fingerprint being associated therewith, the method comprising:
   receiving: (i) RF signal data from a plurality of RF sources and (ii) tracking data from a sensor, the tracking data indicating at least one of a user's orientation relative to a map point and a user's movement relative to a base map point; and
   updating the map-point grid by at least one of adding a new map point to the grid and updating an existing map point of the grid, based on, at least in part, at least one of: (i) adjusted RF data obtained by adjusting the received RF data using the tracking data, and (ii) a combination comprising the received RF data and a location based on a user specified location indication and the tracking data.

7. The method of claim 6, wherein updating the map-point grid comprises:
   computing an RF data fingerprint based on the RF signal data;
   computing a location of the user based on, at least in part, the tracking data, the computed location being different than the base map point;
   adding a new map point to the grid, the new map point being associated with the computed location and the computed RF data fingerprint.

8. The method of claim 6, wherein updating the map-point grid comprises:
   computing a spatial and directional orientation of the user at the base map point with respect to at least one of the plurality of RF sources based on, at least in part, the tracking data; and
   updating a fingerprint associated with a map point in the grid, based on, at least in part, both the received RF data and the computed orientation.

9. The method of claim 6, wherein updating the map-point grid comprises:
   computing a location of a user based on, at least in part, the tracking data;
   designating the computed location as a new map point;
   associating a set of other map points with the new map point;
   updating the RF signal data received at the new map point from at least one of the plurality of RF sources, based on, at least in part, RF signal data received from that RF source at each of the other map points in the set associated with the new map point;
   computing an RF data fingerprint based in part on the updated RF signal data; and
   associating the computed RF data fingerprint with the new map point.

10. The method of claim 9, wherein updating the received RF signal data comprises computing an average of a parameter of the received RF signal data.

11. The method of claim 10, wherein the average is a weighted average.

12. The method of claim 10, wherein the parameter is at least one of RF signal power and yield data.

13. The method of claim 9 further comprising:
    receiving at the new map point, a location of a user based on, at least in part, a location confirmation signal; and
    determining if the computed location is substantially same as the received location.

14. A method of calibrating a map-point grid for indoor location determination, the grid comprising a plurality of map points, each having a radio frequency (RF) data fingerprint being associated therewith, the method comprising:
    receiving RF signal data from a plurality of RF sources;

selecting a map;
selecting a set of other map points from the map-point grid, each of which is within a threshold distance from the selected map point;
computing a fingerprint as a function of the received RF signal data and the RF signal data associated with each of the other map points in the set;
associating the computed fingerprint with the selected map point;
updating the map-point grid using the selected map point and the fingerprint associated therewith.

15. The method of claim 14, wherein the function is interpolation.

16. The method of claim 15, wherein the interpolation is one of simple averaging and weighted averaging.

17. The method of claim 6, wherein:
the grid comprises a plurality of routes, each route corresponding to a set of map points comprising a reference map point, a radio frequency (RF) data fingerprint being associated with each map point in the set of map points corresponding to each route;
receiving the user specified location indication comprises receiving from a device associated with a user, an identification of a map point and an identification of a route; and
updating the map-point grid comprises updating a weight associated with the RF data fingerprint associated with each map point in the set of map points corresponding to the identified route, if the identified map point is determined not to represent the reference map point corresponding to the identified route.

18. The method of claim 17, wherein the reference map point comprises one of a start map point, representing a starting point of the identified route, and an end map point, representing an end point of the identified route.

19. The method of claim 17, wherein receiving the identification of the route comprises receiving at least one of a designated route number and a designated route name.

20. The method of claim 17, wherein receiving the identification of the route comprises receiving a selection of the route from a specified list of routes.

21. The method of claim 17, wherein receiving the RF signal data comprises receiving, from the device associated with the user, RF data associated with each map point in the set of map points corresponding to the identified route, the fingerprint associated with each map point being based on, at least in part, the received RF data associated with the corresponding map point.

22. The method of claim 6, wherein:
the grid comprises a route corresponding to a set of map points;
receiving the RF signal data comprises receiving a plurality of calibration scans corresponding to the route, receiving each scan comprising receiving sensor data associated with each map point in the set of map points corresponding to the route; and
updating the map-point grid comprises, for each calibration scan:
determining a value of a route parameter, based on, at least in part, the sensor data corresponding to the scan;
assigning a weight to the calibration scan, based on, at least in part, a comparison of the determined value of the route parameter and a statistical value associated with the route parameter.

23. The method of claim 22, further comprising computing the statistical value associated with the route parameter, based on, at least in part, the plurality of calibration scans.

24. The method of claim 22, wherein updating the map-point grid further comprises computing for each map point corresponding to the route, an RF fingerprint, based on, at least in part, the plurality of calibration scans and the weight assigned to each calibration scan.

25. The method of claim 22, wherein the route parameter comprises at least one of a list of access points observable on the route, a power of an access point observable on the route, a yield of an access point observable on the route, a number of turns on a route, a length of a segment of the route, an orientation of a segment of the route, acceleration observable on the route, altitude associated with the route, and barometric pressure observable on the route.

26. The method of claim 6, wherein the sensor data comprises inertial navigation sensor data.

27. The method of claim 6, wherein:
the grid comprises a plurality of segments, each segment comprising a set of map points and each map point corresponds to a map location; and
the method further comprises:
designating a segment from the plurality of segments as a candidate segment;
excluding from a data set used by a location-determination engine to compute a device location, radio frequency (RF) data associated with each map point in the set of map points associated with the candidate segment;
selecting a subset of map points from the set of map points associated with the candidate segment;
determining a reference location based on, at least in part, map locations corresponding to each map point in the subset;
obtaining from the location-determination engine a location based on, at least in part, RF data associated with each map point in the subset;
adjusting in the data set used by the location-determination engine a weight associated with the candidate segment, based on, at least in part, a comparison of the obtained location with the reference location.

28. The method of claim 27, wherein the method further comprises:
selecting a set of segments, each segment in the set comprising a map point within a specified distance from a map point corresponding to the candidate segment;
computing a fitness measure based on a comparison of a fingerprint associated with the map point corresponding to the candidate segment and map points corresponding to the segments in the selected set; and
further adjusting the weight associated with the candidate segment based on, at least in part, the fitness measure.

29. The method of claim 27, wherein the candidate segment comprises a first sub-segment and a second sub-segment connected to the first sub-segment at an angle other than 180°.

30. The method of claim 27, wherein:
the subset consists essentially of a single map point; and
the reference location comprises the map location corresponding to the single map point.

31. The method of claim 6, wherein:
the grid comprises a plurality of segments, each segment comprising a set of map points and each map point corresponds to a map location; and the method further comprises:
designating a segment from the plurality of segments as a candidate segment;
selecting a set of segments, each segment in the set comprising a map point within a specified distance from a map point corresponding to the candidate segment;
computing a fitness measure based on a comparison of a fingerprint associated with the map point corresponding to the candidate segment and map points corresponding to the segments in the selected set; and
adjusting in the data set used by the location-determination engine a weight associated with the candidate segment based on, at least in part, the fitness measure.

32. A system for determining a location of a user within an indoor environment, the system comprising:
a receiver adapted to receive (i) radio frequency (RF) signal data from each RF source of a plurality of RF sources, and (ii) tracking data from a sensor; and
a processor adapted to: (i) compute a yield of the RF source based on the received data, by computing a frequency of the received RF data over at least one of a period of time or a number of observations, (ii) select a subset of fingerprints from a database of fingerprints, based on, at least in part, the yield associated with each of the plurality of RF sources, and (iii) determine a location of a user based on, at least in part: (a) the RF signal data received from each of the RF sources in the subset, and (b) the received tracking data.

33. A system for determining a location of a user within an indoor environment, the system comprising:
a receiver adapted to: (i) receive at a first time instant, a first set of radio frequency (RF) data from a plurality of RF sources, (ii) receive at a second time instant: (a) a second set of RF data from the plurality of RF sources, and (b) tracking data from an inertial navigation system; and
a processor adapted to compute:
compute based at least in part on the first set of RF data, a first location estimate and a second location estimate;
compute based at least in part on the second set of RF data, a third location estimate and a fourth location estimate;
compute a fifth location estimate based in part on the first location estimate, and a sixth location estimate based in part on the second location estimate, both the fifth and sixth location estimates also being based in part on the tracking data;
compute an error metric by comparing: (i) the fifth location estimate with at least one of the third and fourth location estimates, and (ii) the sixth location estimate with at least one of the third and fourth location estimates; and
designate based at least in part on the error metric: (i) one of the first and second location estimates as a location of the user at the first time instant, and (ii) one of the third and fourth location estimates as a location of the user at the second time instant.

34. A system for calibrating a map-point grid for indoor location determination, the grid comprising a plurality of map points, each having a radio frequency (RF) data fingerprint being associated therewith, the system comprising:
a receiver adapted to receive: (i) RF signal data from a plurality of RF sources and (ii) tracking data from a sensor, the tracking data indicating at least one of a user's orientation relative to a map point and a user's movement relative to a base map point; and
a processor adapted to update the map-point grid by at least one of adding a new map point to the grid and updating an existing map point of the grid, based on, at least in part, at least one of: (i) adjusted RF data obtained by adjusting the received RF data by the processor using the tracking data, and (ii) a combination comprising the received RF data and a location based on a user specified location indication and the tracking data.

35. An article of manufacture, comprising a non-transitory machine-readable medium storing instructions that, when executed by a machine configure the machine, for calibrating a map-point grid for indoor location determination, the grid comprising a plurality of map points, each having a radio frequency (RF) data fingerprint being associated therewith, to:
receive: (i) RF signal data from a plurality of RF sources and (ii) tracking data from a sensor, the tracking data indicating at least one of a user's orientation relative to a map point and a user's movement relative to a base map point; and
update the map-point grid by at least one of adding a new map point to the grid and updating an existing map point of the grid, based on, at least in part, at least one of: (i) adjusted RF data obtained by adjusting the received RF data using the tracking data, and (ii) a combination comprising the received RF data and a location based on a user specified location indication and the tracking data.

36. A system for calibrating a map-point grid for indoor location determination, the grid comprising a plurality of map points, each having a radio frequency (RF) data fingerprint being associated therewith, the system comprising:
a receiver adapted to receive RF signal data from a plurality of RF sources; and
a processor adapted to:
select a map point;
select a set of other map points from the map-point grid, each of which is within a threshold distance from the selected map point;
compute a fingerprint as a function of the received RF signal data and the RF signal data associated with each of the other map points in the set;
associate the computed fingerprint with the selected map point; and
update the map-point grid using the selected map point and the fingerprint associated therewith.

37. A method of calibrating a map-point grid for indoor location determination, the grid comprising a plurality of map points, each having a radio frequency (RF) data fingerprint being associated therewith, the method comprising:
receiving RF signal data from a plurality of RF sources and a user specified location indication;
associating the received RF data and a location corresponding to the received location indication with a map point; and
updating the map-point grid using the map point.

38. The method of claim 37, further comprising:
receiving a location of a user based on, at least in part, the received RF data; and
determining if the location corresponding to the received location indication is substantially same as the location of the user based on, at least in part, the received RF data.

* * * * *

UNITED STATES PATENT AND TRADEMARK OFFICE
CERTIFICATE OF CORRECTION

PATENT NO. : 9,439,041 B2  Page 1 of 1
APPLICATION NO. : 13/932646
DATED : September 6, 2016
INVENTOR(S) : Parvizi et al.

It is certified that error appears in the above-identified patent and that said Letters Patent is hereby corrected as shown below:

In the Claims

Claim 14 Column 23, Line 1, "selecting a map;" should be replaced with "selecting a map point;".

Signed and Sealed this
Third Day of January, 2017

Michelle K. Lee
*Director of the United States Patent and Trademark Office*